US009110733B2

(12) United States Patent
Yamashita et al.

(10) Patent No.: US 9,110,733 B2
(45) Date of Patent: Aug. 18, 2015

(54) MULTI-CORE PROCESSOR SYSTEM, ARBITER CIRCUIT CONTROL METHOD, AND COMPUTER PRODUCT

(75) Inventors: Koichiro Yamashita, Hachioji (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 377 days.

(21) Appl. No.: 13/613,634

(22) Filed: Sep. 13, 2012

(65) Prior Publication Data

US 2013/0013834 A1  Jan. 10, 2013

Related U.S. Application Data

(63) Continuation of application No. PCT/JP2010/054709, filed on Mar. 18, 2010.

(51) Int. Cl.
*G06F 9/50* (2006.01)
*G06F 13/16* (2006.01)

(52) U.S. Cl.
CPC ............ *G06F 9/5083* (2013.01); *G06F 9/5016* (2013.01); *G06F 13/1605* (2013.01); *G06F 13/1652* (2013.01); *G06F 13/16* (2013.01)

(58) Field of Classification Search
CPC ....... G06F 9/5016; G06F 9/50; G06F 9/5005; G06F 13/1605; G06F 13/1652; G06F 9/5083
USPC .................... 710/240; 711/150, 151; 718/104
See application file for complete search history.

(56) References Cited

U.S. PATENT DOCUMENTS

| 2006/0136681 | A1 | 6/2006 | Jain et al. |
| 2006/0294239 | A1 | 12/2006 | Ishida |
| 2008/0301474 | A1 | 12/2008 | Bussa et al. |

(Continued)

FOREIGN PATENT DOCUMENTS

| CN | 101610209 | 12/2009 |
| EP | 1785828 A1 | 5/2007 |
| JP | 02-143363 | 6/1990 |

(Continued)

OTHER PUBLICATIONS

International Preliminary Report on Patentability issued Sep. 27, 2012 (English Translation mailed Nov. 1, 2012) in corresponding International Patent Application No. PCT/JP2010/054709.

(Continued)

*Primary Examiner* — Glenn A Auve
(74) *Attorney, Agent, or Firm* — Staas & Halsey LLP

(57) ABSTRACT

A multi-core processor system includes multiple cores; shared memory accessed by the cores; and an arbiter circuit that arbitrates contention of right to access the shared memory by the cores. Each of the cores is configured to acquire for the core, a measured speed of access to the shared memory; calculate for the core, a response performance based on the measured speed of access and a theoretical speed of access for the core; calculate for the cores and based on the response performance calculated for each of the cores, ratios of access rights to access the shared memory, the ratios being calculated such that a ratio of access rights for a given core is larger than a ratio of access rights for another core whose response performance is higher than that of the given core; and notify the arbiter circuit of the calculated ratios of access rights.

11 Claims, 15 Drawing Sheets

(56) References Cited

U.S. PATENT DOCUMENTS

2009/0210654 A1   8/2009  Koul et al.
2009/0248976 A1*  10/2009 Rotithor ...................... 711/113

FOREIGN PATENT DOCUMENTS

| JP | 10-143382 | 5/1998 |
| JP | 11-110363 | 4/1999 |
| JP | 2003-271404 | 9/2003 |
| JP | 2007-4595 | 1/2007 |
| JP | 2009-501482 | 1/2009 |
| JP | 2009-521056 | 5/2009 |
| JP | 2009-251871 | 10/2009 |

OTHER PUBLICATIONS

International Search Report for PCT/JP2010/054709, mailed Jun. 8, 2010.

Chinese Office Action dated Sep. 3, 2014 in corresponding Chinese Patent Application No. 201080065475.9.

Extended European Search Report mailed Apr. 22, 2013 for corresponding European Application No. 10847910.6.

Chinese Office Action issued May 4, 2015 in corresponding Chinese Patent Application No. 201080065475.9

\* cited by examiner

FIG.4

| THREAD NAME | PROCESS CONTENTS | BEFORE-OPERATION EXECUTION TIME PERIOD t | DEADLINE TIME PERIOD D |
|---|---|---|---|
| UI | UI RESPONSE PROCESS | 1 MILLISECOND | 10 MILLISECOND |
| WINDOW CONTROL | DRAWING UPDATING PROCESS | 14 MILLISECOND | 16 MILLISECOND |
| MOVING IMAGE REPRODUCTION | FRAME PROCESS | 12 MILLISECOND | 33 MILLISECOND |
| WEB BROWSER | CONTENT PROCESS | 50 MILLISECOND | NO TIME LIMIT |

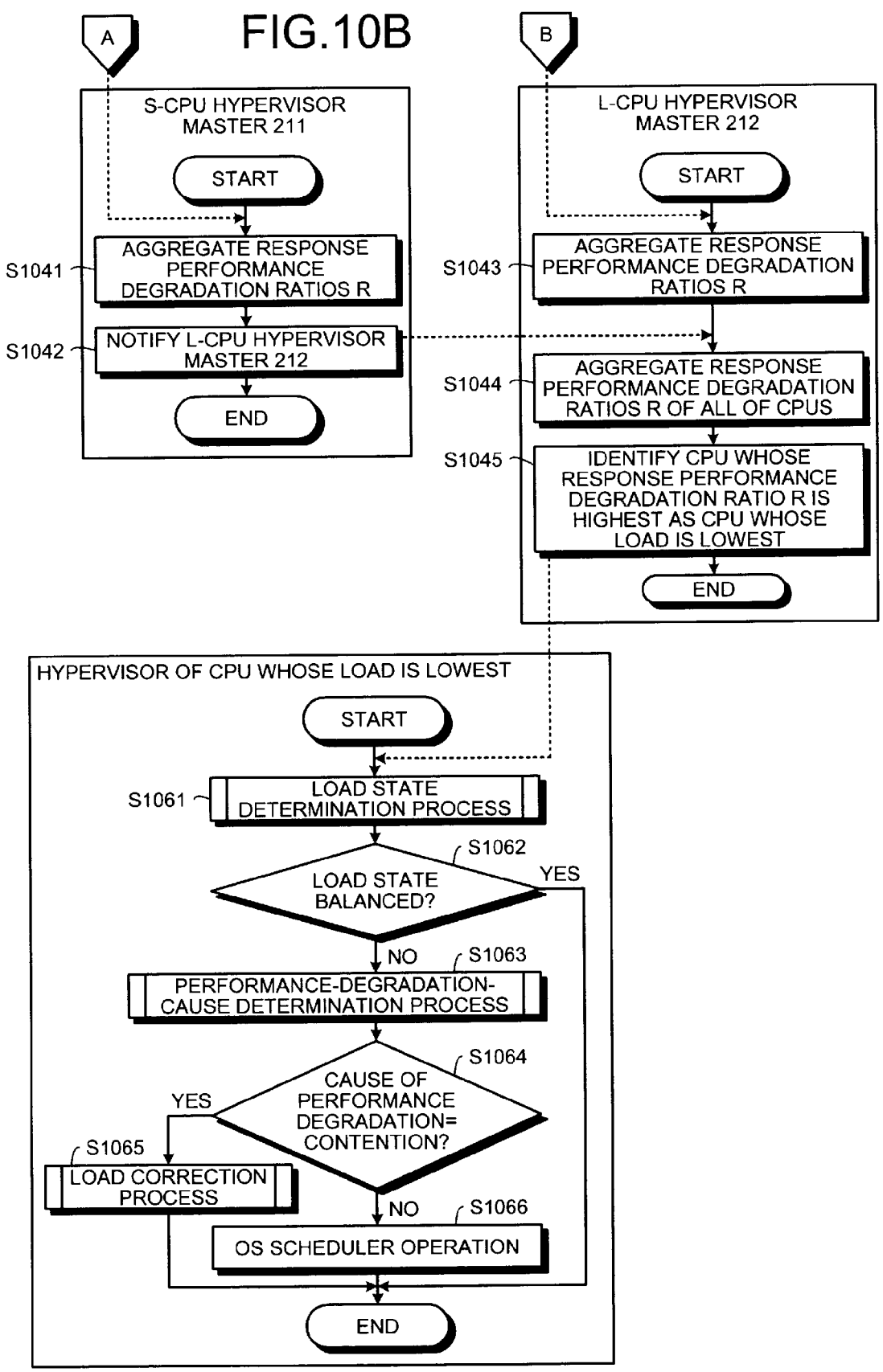

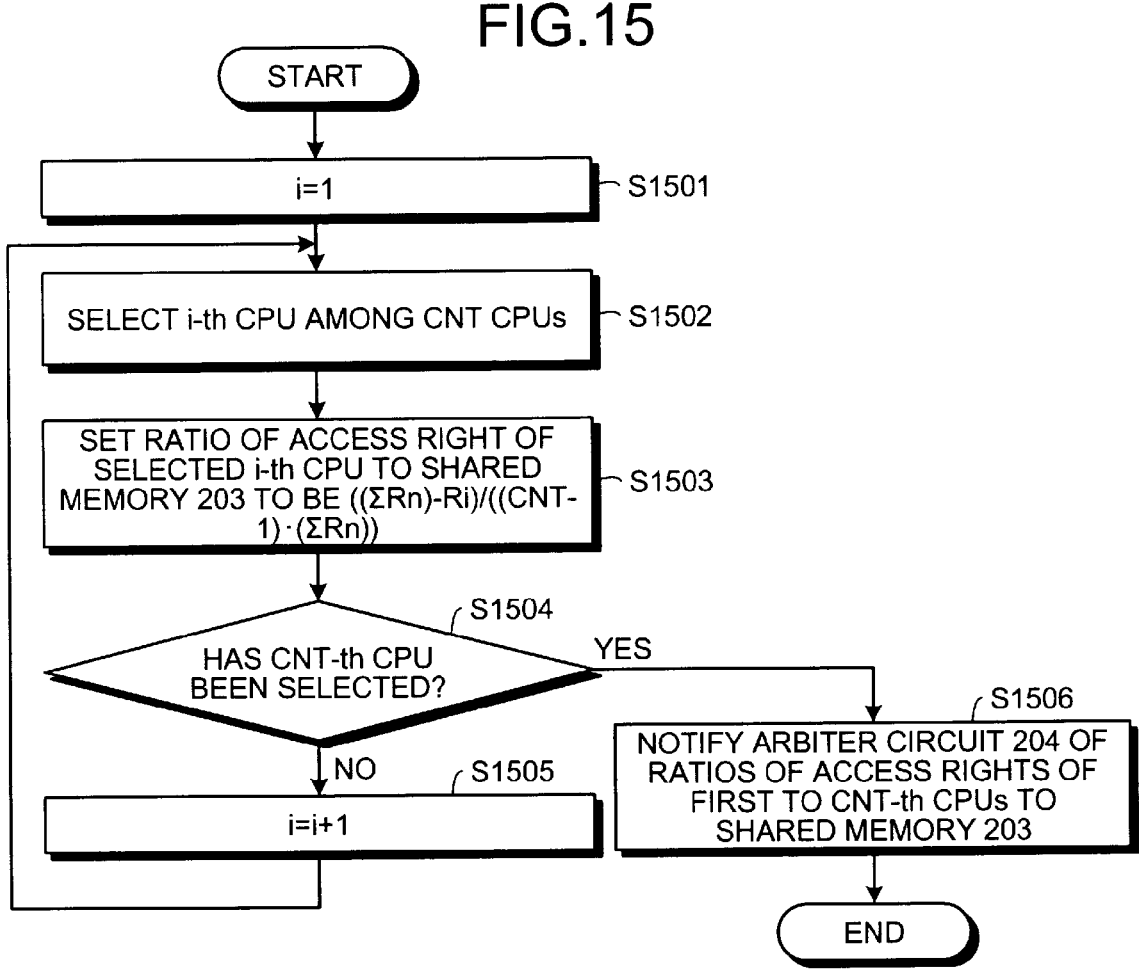

MULTI-CORE PROCESSOR SYSTEM, ARBITER CIRCUIT CONTROL METHOD, AND COMPUTER PRODUCT

CROSS REFERENCE TO RELATED APPLICATIONS

This application is a continuation application of International Application PCT/JP2010/054709, filed on Mar. 18, 2010 and designating the U.S., the entire contents of which are incorporated herein by reference.

FIELD

The embodiments discussed herein are related to a multi-core processor system, an arbiter circuit control method, and an arbiter circuit control program that control an arbiter circuit.

BACKGROUND

A conventional technology has been disclosed where a multi-core processor system is formed by equipping multiple central processing units (CPUs) to a computer system. In the multi-core processor system, parallel processing is enabled by assigning software to the CPUs via a function of an operating system (OS).

A technology has been disclosed as a resource control method for a multi-core processor system reduces power consumption of contents whose calculation densities are low by dynamically increasing or decreasing the calculation capacity of the CPUs using statistical information based on historical load properties of specific processes (see, e.g., Japanese Laid-Open Patent Publication No. 2009-501482). A technology has been disclosed according to which a hardware performance counter is attached to a multi-core processor system to dynamically analyze the amount of load and when the amount of load counted does not reach the performance set in advance, necessary hardware resources are enhanced (see, e.g., Japanese Laid-Open Patent Publication No. 2009-521056).

In a multi-core processor system, access contention occurs consequent to simultaneous access of shared memory by the multiple cores and the performance of the system is degraded. A technology has been disclosed according to which, when access contention for the memory occurs, a low-speed clock is supplied to CPUs that do not so frequently access the memory and thereby, the throughput is improved of each of the CPUs that frequently access the memory (see, e.g., Japanese Laid-Open Patent Publication No. H11-110363).

However, among the conventional techniques, a problem arises with the technology according to Japanese Laid-Open Patent Publication No. 2009-501482 in that no statistical value is collected for a device by which arbitrary operations are executed by the user thereof. For example, for a system having multiple applications, each started up at an arbitrary timing by the user, a problem arises in that combinations of applications are tremendous and storage of statistical information therefore is impractical.

In the technology according to Japanese Laid-Open Patent Publication No. 2009-521056, the occurrence of contention with access to the memory is coped with by increasing the speed of the clock of the delayed CPUs or by increasing the clock of the memory. A problem arises with these methods of coping with contention in that not only the power consumption is increased but also the problem on the performance of the memory caused by the access contention remains unsolved by merely increasing the clocks. Another problem also arises for a large-scale system-on-a-chip (SoC) in that it is difficult to determine where the performance counter is to be disposed. Meanwhile, yet another problem arises in that the scale of the system is increased when performance counters are disposed at all the possible points such as at CPUs and buses.

A problem arises with the technology according to Japanese Laid-Open Patent Publication No. H11-110363 in that the decreasing of the speed of the CPUs not so frequently accessing the memory also influences applications that operate in the space on a cache memory and whose speeds do not need to be decreased.

In a heterogeneous multi-core processor system that is an asymmetrical multi-core processor system, the loads on the CPUs are imbalanced due to the property of asymmetry and therefore, a problem arises in that wasteful utilization of the CPU resource occurs.

SUMMARY

According to an aspect of an embodiment, a multi-core processor system includes multiple cores; shared memory accessed by the cores; and an arbiter circuit that arbitrates contention of right to access the shared memory by the cores. Each of the cores is configured to acquire for the core, a measured speed of access to the shared memory; calculate for the core, a response performance based on the measured speed of access and a theoretical speed of access for the core; calculate for the cores and based on the response performance calculated for each of the cores, ratios of access rights to access the shared memory, the ratios being calculated such that a ratio of access rights for a given core is larger than a ratio of access rights for another core whose response performance is higher than that of the given core; and notify the arbiter circuit of the calculated ratios of access rights.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram of an example of the contents of a profile data table 301;

FIG. 10B is a flowchart of an arbiter circuit control process (part 2);

FIG. 15 is a flowchart of a load correction process.

DESCRIPTION OF EMBODIMENTS

Preferred embodiments of a multi-core processor system, an arbiter circuit control method, and an arbiter circuit control program will be explained with reference to the accompanying drawings.

Figure 1:
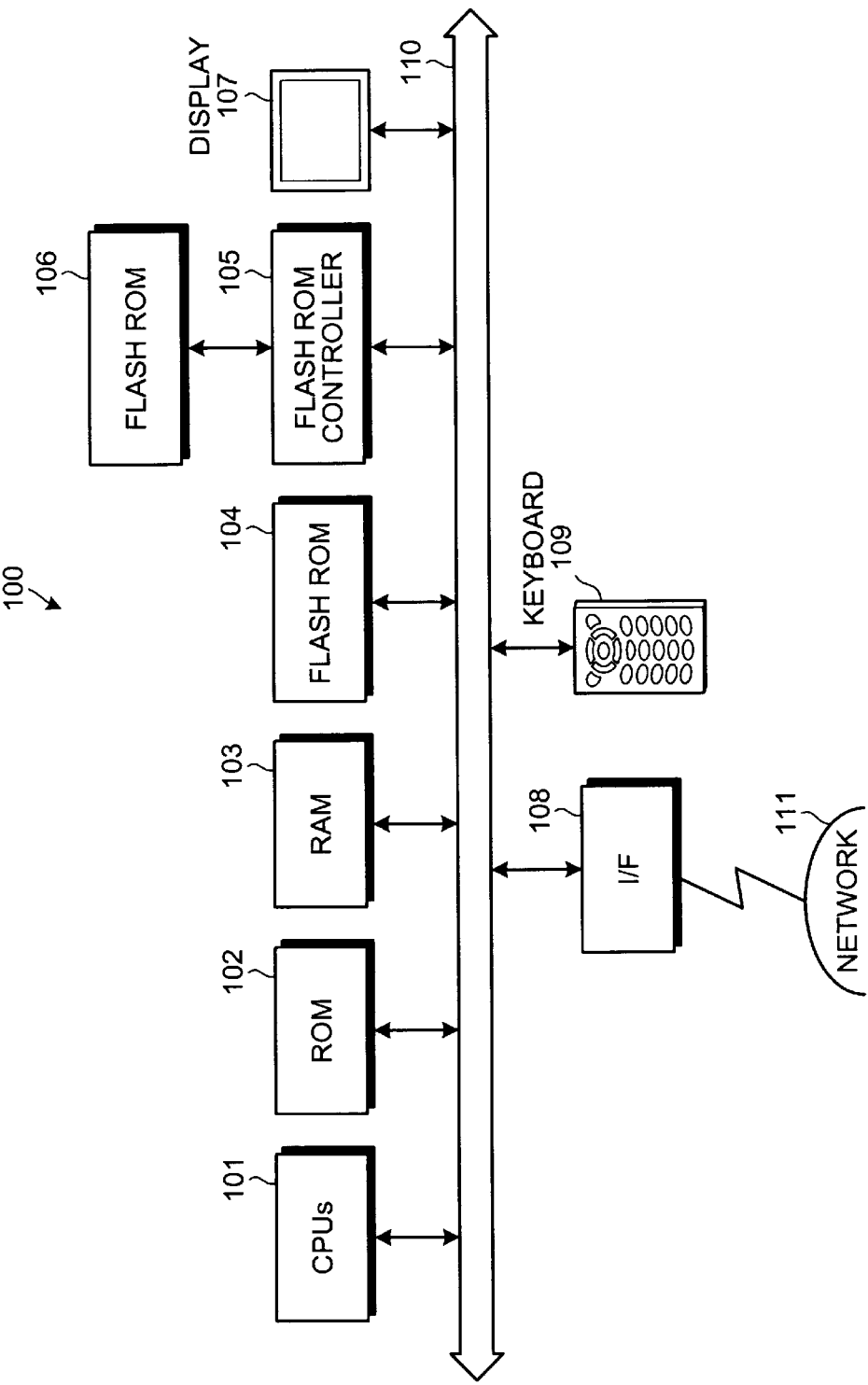
FIG. 1 is a block diagram of a hardware configuration of a multi-core processor system according to an embodiment.

FIG. 1 is a block diagram of a hardware configuration of a multi-core processor system according to an embodiment. As depicted in FIG. 1, a multi-core processor system 100 includes multiple central processing units (CPUs) 101, read-only memory (ROM) 102, random access memory (RAM) 103, flash ROM 104, a flash ROM controller 105, and flash ROM 106. The multi-core process system includes a display 107, an interface (I/F) 108, and a keyboard 109, as input/output devices for the user and other devices. The components of the multi-core system 100 are respectively connected by a bus 110.

The CPUs 101 govern overall control of the multi-core processor system 100. The CPUs 101 refer to CPUs that are single core processors connected in parallel. Details of the CPUs 101 will be described hereinafter with reference to FIG. 2. Further, the multi-core processor system 100 is a system of computers that include processors equipped with multiple cores. Provided that multiple cores are provided, implementation may be by a single processor equipped with multiple cores or a group of single-core processors in parallel. In the present embodiments, description will be given using heterogeneous multi-cores as an example where single-core processor CPUs are connected in parallel and have differing performance.

The ROM 102 stores therein programs such as a boot program. The RAM 103 is used as a work area of the CPUs 101. The flash ROM 104 stores system software such as an operating system (OS), and application software. For example, when the OS is updated, the multi-core processor system 100 receives a new OS via the I/F 108 and updates the old OS that is stored in the flash ROM 104 with the received new OS.

The flash ROM controller 105, under the control of the CPUs 101, controls the reading and writing of data with respect to the flash ROM 106. The flash ROM 106 stores therein data written under control of the flash ROM controller 105. Examples of the data include image data and video data received by the user of the multi-core processor system through the I/F 108. A memory card, SD card and the like may be adopted as the flash ROM 106.

The display 107 displays, for example, data such as text, images, functional information, etc., in addition to a cursor, icons, and/or tool boxes. A thin-film-transistor (TFT) liquid crystal display and the like may be employed as the display 107.

The I/F 108 is connected to a network 111 such as a local area network (LAN), a wide area network (WAN), and the Internet through a communication line and is connected to other apparatuses through the network 111. The I/F 108 administers an internal interface with the network 111 and controls the input/output of data from/to external apparatuses. For example, a modem or a LAN adaptor may be employed as the I/F 108.

The keyboard 109 includes, for example, keys for inputting letters, numerals, and various instructions and performs the input of data. Alternatively, a touch-panel-type input pad or numeric keypad, etc. may be adopted.

Figure 2:
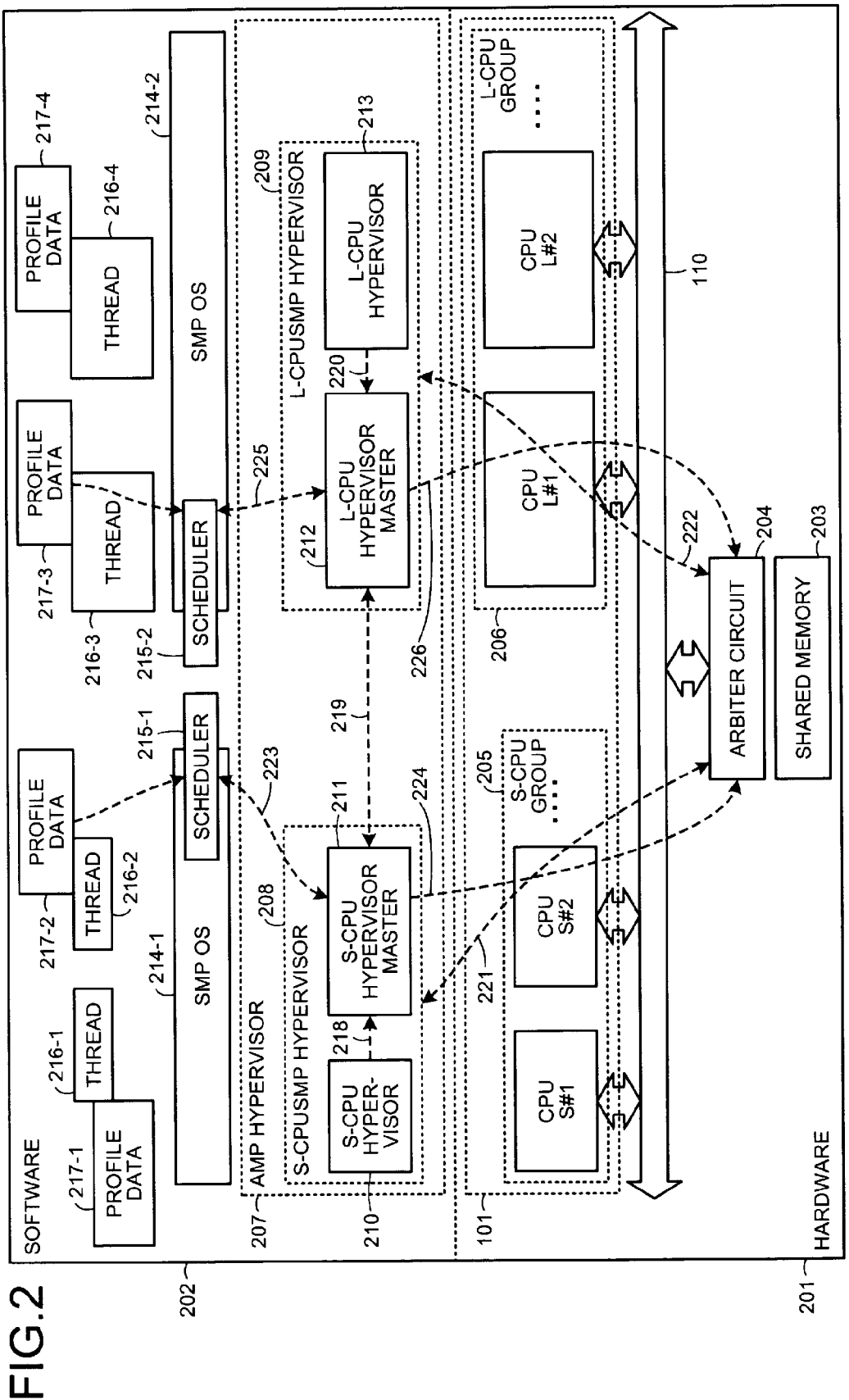
FIG. 2 is a block diagram of a partial hardware configuration and a software configuration of a multi-core processor system 100.

FIG. 2 is a block diagram of a partial hardware configuration and a software configuration of the multi-core processor system 100. A block diagram belonging to an area 201 depicts the partial hardware configuration and a block diagram belonging to an area 202 depicts the software configuration. Hardware depicted in FIG. 2 are shared memory 203, an arbiter circuit 204, and an S-CPU group 205 and an L-CPU group 206 included among the CPUs 101. The arbiter circuit 204, and the S-CPU and the L-CPU groups 205 and 206 are connected to each other by the bus 110.

The shared memory 203 is a storage area accessible from the CPUs belonging to the S-CPU and the L-CPU groups 205 and 206. The "storage area" is, for example, the ROM 102, the RAM 103, or the flash ROM 104.

The arbiter circuit 204 controls access to the shared memory 203 by the CPUs belonging to the S-CPU and L-CPU groups 205 and 206. In a case where a CPU requests to access the shared memory 203 while another CPU is already accessing the shared memory 203, the arbiter circuit 204 causes the CPU requesting access to stand by. If no other CPU is accessing the shared memory 203, the arbiter circuit 204 issues access permission to the CPU requesting to access the shared memory 203. The arbiter circuit 204 has a buffer prepared therefore to manage requests and sets the ratio of accesses for each CPU.

The S-CPU group 205 is a set of CPUs each having low performance and is configured by CPUS #1, CPUS #2, ..., CPUS #M. The L-CPU group 206 is a set of CPUs each having high performance and is configured by CPUL #1, CPUL #2, ..., CPUL #N. The multi-core processor system 100 according to the embodiment is configured by the two kinds of CPU groups each having a performance level different from that of each other. However, the multi-core processor system 100 may be configured by three or more kinds of CPU groups each having a performance level different from that of each other. Each of the CPUs is equipped with local cache memory. The CPU accesses the local cache memory and executes a computing process and, in addition, accesses the shared memory 203 when the CPU needs data that is not stored in the local cache memory.

The software depicted in FIG. 2 include an Asymmetric Multiple Processor (AMP) hypervisor 207, Symmetric Multiple Processor (SMP) OSs 214-1 and 214-2, threads 216-1 to 216-4, and profile data 217-1 to 217-4. The "hypervisor" is a program that operates directly on the hardware. The hypervisor can execute privilege instructions to directly refer to a register in a CPU, read information of a register in a CPU, and rewrite information of a special register that executes an I/O operation in a CPU. The hypervisor controls the cache of a CPU that any ordinary program is unable to operate, and operates using a space on memory that any ordinary program is unable to read and write. The hypervisor is positioned between an OS and a CPU, supervises the OS based on the characteristics above, resets the OS when the OS is hung up and sets the OS to be in a power-saving mode when the OS executes no thread.

The AMP hypervisor 207 is a set of hypervisors each having a different function for each CPU. The AMP hypervisor 207 is configured by an S-CPUSMP hypervisor 208 and an L-CPUSMP hypervisor 209.

The S-CPUSMP hypervisor 208 is a set of hypervisors executed by the CPUs belonging to the S-CPU group 205. The hypervisors belonging to the S-CPUSMP hypervisor 208 each execute inter-hypervisor communication 218 between the hypervisors belonging to the S-CPUSMP hypervisor 208. The hypervisors belonging to the S-CPUSMP hypervisor 208 execute accesses 221 to the shared memory 203 for the arbiter circuit 204 and measure the access speeds and thereby, acquire measured speeds.

In the embodiment, the CPUS #1 executes an S-CPU hypervisor 210. The CPUS #2 executes an S-CPU hypervisor master 211 that controls other hypervisors in the S-CPUSMP hypervisor 208. A function of the S-CPU hypervisor master 211 executes inter-hypervisor communication 219 with the L-CPUSMP hypervisor 209 in addition to functions that the S-CPU hypervisor 210 has. The S-CPU hypervisor master 211 executes information communication 223 with a scheduler 215-1 of the OS 214-1 and executes notification 224 of the ratio of access rights to the arbiter circuit 204. The CPUs belonging to the S-CPU group 205 other than the CPUSs #1 and #2 also execute the S-CPU hypervisors.

The L-CPUSMP hypervisor 209 is a set of hypervisors executed by the CPUs belonging to the L-CPU group 206. The hypervisors belonging to the L-CPUSMP hypervisor 209 each execute inter-hypervisor communication 220 between the hypervisors belonging to the L-CPUSMP hypervisor 209. The hypervisors belonging to the L-CPUSMP hypervisor 209 execute accesses 222 to the shared memory 203 for the arbiter circuit 204 and measure the access speeds.

In the embodiment, the CPUL #2 executes an L-CPU hypervisor 213. The CPUL #1 executes an L-CPU hypervisor master 212 that controls other hypervisors in the L-CPUSMP hypervisor 209. A function of the L-CPU hypervisor master 212 executes inter-hypervisor communication 219 with the S-CPUSMP hypervisor 208 in addition to functions that the L-CPU hypervisor 213 has. The L-CPU hypervisor master 212 executes information communication 225 with a scheduler 215-2 of the SMP OS 214-2 and executes notification 226 of the ratio of access rights to the arbiter circuit 204. The CPUs belonging to the L-CPU group 206 other than the CPULs #1 and #2 also execute the S-CPU hypervisors.

The SMP OSs 214-1 and 214-2 are OSs executed respectively on the S-CPU and the L-CPU groups 205 and 206. The SMP OSs 214-1 and 214-2 assign the threads 216-1 to 216-4 to the CPUs 101 respectively via functions of the schedulers 215-1 and 215-2. In the embodiment, the threads 216-1 to 216-4 are respectively assigned to the CPUSs #1 and #2 and the CPULs #1 and #2.

The profile data 217-1 to 217-4 are profile data respectively corresponding to the threads 216-1 to 216-4. The details of the profile data will be described later with reference to FIG. 4. The schedulers 215-1 and 215-2 acquire the profile data and check whether the processing performance of each of the threads 216-1 to 216-4 deviates from the original processing performance thereof.

Figure 3:
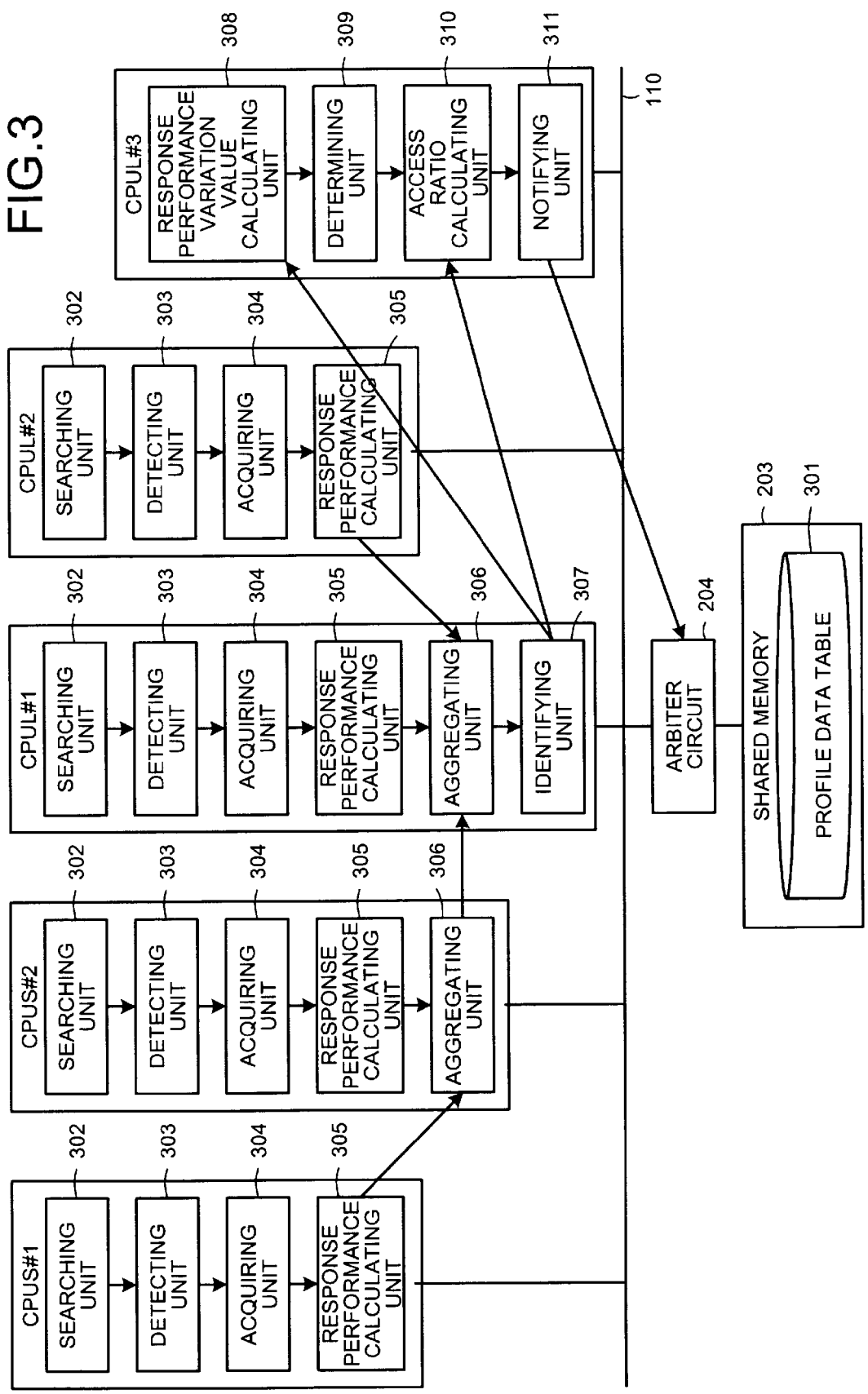
FIG. 3 is a block diagram of a functional configuration of the multi-core processor system 100.

A functional configuration of the multi-core processor system 100 will be described. FIG. 3 is a block diagram of a functional configuration of the multi-core processor system 100. The multi-core processor system 100 includes a searching unit 302, a detecting unit 303, an acquiring unit 304, a response performance calculating unit 305, an aggregating unit 306, an identifying unit 307, a response performance variation value calculating unit 308, a determining unit 309, an access ratio calculating unit 310, and a notifying unit 311.

The functions (the searching unit 302 to the notifying unit 311) act as a control unit and are realized by executing on the CPUs 101, programs stored in a storage device. The "storage device" is, for example, the shared memory 203.

The multi-core processor system 100 retains in the shared memory 203, a profile data table 301 as a database to store an estimated time period within which a given process comes to an end for each given process executed in the software. The details of the profile data table 301 will be described later with reference to FIG. 4.

The searching unit 302 and the detecting unit 303 are included among the functions of the SMP OSs 214-1 and 214-2. Similarly, the units from the acquiring unit 304 to the notifying unit 311 are included among the functions of the AMP hypervisor 207. Although the aggregating unit 306 is depicted as a function of the CPUS #2 and the CPUL #1, the aggregating unit 306 may be a function of any of the CPUs. The same holds for the identifying unit 307. In the embodiment, the CPUL #3 is identified by the identifying unit 307 and the units from the response performance variation value calculating unit 308 to the notifying unit 311 are depicted as the functions of the CPUL #3. The identifying unit 307 may identify other CPUs and in this case, the units from the response performance variation value calculating unit 308 to the notifying unit 311 are functions of the identified CPU.

The searching unit 302 has a function of searching the profile data table 301 for an estimated time period corresponding to a process being executed by software assigned to a core. A "core" is each CPU among the CPUs 101. For example, when the CPUS #1 executes a UI thread, the CPUS #1 acquires a before-operation execution time period t and a deadline time period D from the profile data table 301. The smaller value of the time periods t and D acquired may be taken as the estimated time period or the smaller value of t·(1+τ) and D may be taken as the estimated time period taking into consideration the overhead due to systemization. The retrieved estimated time period is stored to a storage area such as the shared memory 203.

The detecting unit 303 has a function of detecting for each core software that is assigned to a core and whose processing being executed does not come to an end within the estimated time period retrieved by the searching unit 302. For example, when a window control thread is assigned to the CPUS #2, the detecting unit 303 detects that a drawing updating process in the window control thread does not come to an end even when the time period t·(1+τ) or D elapses. The AMP hypervisor 207 is notified of detection results, which in addition, may be stored to a storage area such as the shared memory 203.

The acquiring unit 304 has a function of acquiring for each core, a measured speed at which the core accesses the shared memory 203. When the detecting unit 303 detects software that does not come to an end within the estimated time period, the acquiring unit 304 may acquire the measured speed. For example, the CPUS #1 accesses the shared memory 203 and acquires the measured speed by measuring the access speed based on the time consumed to perform Read/Write. The measured speed acquired is stored to the register or the cache memory of the CPU.

The response performance calculating unit 305 has a function of calculating for each core, the response performance of the core based on the measured access speed acquired by the acquiring unit 304 and the theoretical access speed for the core. The "response performance" is a response performance degradation ratio R and the response performance degradation ratio R is acquired as "the measured speed/the theoretical speed". The response performance may be expressed by exchanging the numerator and the denominator with each other in the calculation for the response performance degradation ratio R. The "theoretical access speed" is the speed of access to the shared memory 203 by a CPU in a state where no load is applied to the CPU. The response performance calculating unit 305 may use as the response performance, the ratio of the operation clock and an issued instruction counter that can be acquired from the hypervisors.

For example, when the theoretical speed is 100 [Mbps] and a measured speed is 20 [Mbps], the response performance degradation ratio R is calculated to be 20/100=0.2. The calculated response performance degradation ratio R is stored to the register or the cache memory of each CPU.

The aggregating unit 306 has a function of aggregating the response performance calculated by each response performance calculating unit 305. For example, the aggregating unit 306 of the CPUS #2 aggregates the response performance degradation ratios R calculated in the S-CPUSMP hypervisor 208. Similarly, the aggregating unit 306 of the CPUL #1 aggregates the response performance degradation ratios R calculated in the AMP hypervisor 207. A more specific example of an aggregation method is to check at specific cycles that the response performance degradation ratios R are written into the register or the cache memory by each hypervisor and determining that the aggregation of the response performance ratios R is completed when writing by all of the hypervisors comes to an end.

The identifying unit 307 has a function of identifying the core whose response performance is highest among the cores, as the core whose load is lowest based on the response performance of each core calculated by the response performance calculating unit 305. For example, when the response performance degradation ratios R of the CPUSs #1 and #2 and the CPULs #1, #2, and #3 are CPUS #1:CPUS #2:CPUL #1:CPUL #2:CPUL #3=0.2:0.3:0.8:0.9:1.0, the identifying unit 307 identifies the CPUL #3 as the CPU whose load is lowest. Information concerning the identified CPU is stored to the register or the cache memory.

The response performance variation value calculating unit 308 has a function of calculating a variation value of the response performance of each core based on the response performance of each core calculated by the response performance calculating unit 305. The "variation value of the response performance" may be, for example, a standard deviation, or another statistical variation value may be used such as an interquartile range, a mean difference, or an average deviation. The response performance variation value calculating unit 308 may calculate the variation value of the response performance via the CPU identified by the identifying unit 307 as the CPU whose load is lowest.

For example, a case is assumed where a standard deviation is used as the variation value of the response performance. When the response performance degradation ratios R of the CPUs are CPUS #1:CPUS #2:CPUL #1:CPUL #2:CPUL #3=0.2:0.3:0.8:0.9:1.0 as in the example above, the standard deviation $\sigma$ thereof is calculated to be about 0.326. The calculated variation value of the response performance is stored to the register or the cache memory of the CPU that executes the response performance variation value calculating unit 308.

The determining unit 309 has a function of determining whether the variation value of the response performance calculated by the response performance variation value calculating unit 308 is larger than a predetermined value. For example, the predetermined value has an error $\Delta$ and takes a numerical value such as 0.1. The determining unit 309 may determine whether the response performance of at least one core among the cores for which the response performance is calculated by the response performance calculating unit 305 is at least a predetermined threshold value. The determining unit 309 may make the determination via the CPU identified by the identifying unit 307 as the CPU whose load is lowest.

For example, when the variation value $\sigma$ of the response performance is $\sigma=0.326$ and the error $\Delta$ is $\Delta=0.1$, it is determined for the CPUL #3 that the variation value $\Delta$ of the response performance is larger than the error $\Delta$. The determination result is stored to the register or the cache memory of the CPU that executes the determining unit 309.

The access ratio calculating unit 310 has a function of calculating for the cores, ratios of access rights to access the shared memory 203, based on the response performance of each core calculated by the response performance calculating unit 305. The access ratio calculating unit 310 calculates the ratios such that the ratio of access rights for a given core is larger than the ratio of the access rights for another core whose response performance is higher than that of the given core.

The access ratio calculating unit 310 may calculate the ratios of access rights when the determining unit 309 determines that the variation value of the response performance is larger than the predetermined value. The access ratio calculating unit 310 may calculate the ratios of access rights when the determining unit 309 determines that among the cores, the response performance of at least one core is equal to or larger than the predetermined threshold value. The access ratio calculating unit 310 may calculate the ratios of access rights via the CPU identified by the identifying unit 307 as the CPU whose load is lowest.

The ratios of access rights of the CPUs may be acquired according to equation (1) below as one method of calculating the ratios, where the response performance degradation ratios R of CPUs 1, 2, . . . , cnt are R1, R2, . . . , Rcnt, for CNT CPUs.

$$CPU1: \quad . \quad . \quad . \quad :CPUcnt=((\Sigma Rn)-R1)/((CNT-1) \cdot (\Sigma Rn)): \ldots :((\Sigma Rn)-Rcnt)/((CNT-1) \cdot (\Sigma Rn)) \quad (1)$$

"$\Sigma Rn$" is the sum of the response performance degradation ratios R of the CPUs 1, 2, . . . , cnt. Division operations are executed each by "(CNT−1)" in equation (1) and this is because the sum of the ratios of the access rights of the CPUs 1 to cnt can be set to be one by executing these divisions. When the sum does not need to be one, no division has to be executed by (CNT−1) and $\Sigma Rn$. equation (2) below may be employed as another method of calculating the ratios.

$$CPU1: \ldots :CPUcnt=1/R1: \ldots :1/Rcnt=\pi Rn/R1: \ldots : \pi Rn/Rcnt \quad (2)$$

"$\pi Rn$" is the total product of the response performance degradation ratios R of the CPUs 1, 2, . . . , cnt. Weighting may be executed for specific CPUs in equation (1) or (2). For example, after the ratios of the access rights are calculated using equation (1) or (2), multiplication by a coefficient equal to or larger than one may be executed for each of the CPUS #2 and the CPUL #1 that respectively execute the S-CPU and L-CPU hypervisor masters 211 and 212. Thereby, specific CPUs can be prioritized correcting the balance of the loads of the CPUs of the multi-core processor system 100.

For example, a case is assumed where the response performance degradation ratios RS#1, RS#2, and RL#1 of the CPUSs #1 and #2 and the CPUL #1 are respectively RS#1=0.3, RS#2=0.2, and RL#1=0.67. In this case, the CPUL #3 calculates the ratios of the access rights of the CPUSs #1 and #2 and the CPUL #1 to be 0.41:0.37:0.21 according to equation (1). The calculated ratios of the access rights are stored to the register or the cache memory of the CPU that executes the access ratio calculating unit 310.

The notifying unit 311 has a function of notifying the arbiter circuit 204 of the ratios of the access rights of the cores to the shared memory 203, calculated by the access ratio calculating unit 310. The notifying unit 311 may give notification of the ratios of the access rights via the CPU that is identified by the identifying unit 307 as the CPU whose load is lowest. For example, when the ratios of the access rights of the CPUSs #1 and #2 and the CPUL #1 are respectively 0.41:0.37:0.21, the CPUL #3 sets these ratios in the register of the arbiter circuit 204. When the CPUL #3 registers the ratios in the register of the arbiter circuit 204 as integers, the CPUL #3 gives notification indicating the ratios of the access rights to be 29:26:15.

FIG. 4 is an explanatory diagram of an example of the contents of the profile data table 301. The profile data table 301 includes four fields, including "Thread Name", "Process Contents", "Before-Operation Execution Period t", and "Dead Line Time D". The Thread Name field indicates the name of a process. A start address of a thread is entered and the CPU refers to the start address of the thread and executes the process.

The Process Content field indicates a process needing to access the shared memory 203 in the thread. When multiple processes each needing to access the shared memory 203 are present in one thread, the processes may be registered in the profile data table 301. The Before-Operation Execution Period t field indicates the period that elapses when the process content stored in the Process Content field is executed without an occurrence of access contention. The Dead Line Time D field indicates the ending time when the ending time is determined for execution of the process content indicated in the Process Content field.

For example, for the UI thread, a UI response process is indicated as the process contents thereof. An example of the UI response process is an updating process of a cursor image consequent to a moving of the cursor. The CPU executes the UI response process when no load is applied the UI response process and when the process comes to an end in one [millisecond], one [millisecond] is set in the Before-Operation Execution Period t field. When the UI response process needs to come to an end within 10 [millisecond] as the specification of the UI response process, 10 [millisecond] is entered in the Dead Line Time D field.

Similarly, for the window control thread, a drawing updating process is indicated as the process contents thereof. An example of the drawing updating process is an updating process of updating image data of the window screen size. Measurement is also executed for the window control thread and 14 [millisecond] is set in the Before-Operation Execution Period t field. When the updating needs to be executed at 60 [frame per second (fps)] as the specification of the window control thread, the permissive time period for one drawing updating process is $1/60 \approx 16$ [millisecond]. Therefore, 16 [millisecond] is entered in the Dead Line Time D field.

Similarly, for a moving image reproduction thread, a frame process is indicated as the process contents thereof. An example of the frame process is an updating process of image data for one frame of a moving image. Measurement is also executed for the moving image reproduction thread and 12 [millisecond] is entered in the Before-Operation Execution Period t field. When a moving image needs to be reproduced at, for example, 30 [fps] as the specification of the moving image reproduction thread, a permissive time period for the one frame process is $1/30 \approx 33$ [millisecond]. Therefore, 33 [millisecond] is entered in the Dead Line Time D field.

Similarly, for a web browser thread, a content process is indicated as the process contents thereof. An example of the content process is an updating process of a content screen. Measurement is also executed for the web browser thread and 50 [millisecond] is entered in the Before-Operation Execution Period t field. When no specification is especially present for the ending time of the web browser thread, "no time limit" is entered in the Dead Line Time D field.

FIGS. 5 to 8 depict a series of states where, in the multi-core processor system 100, contention occurs with respect to the shared memory 203 by the CPUs from the start up of the threads; abnormality is detected concerning the processing capacity of the software; thereafter, correction of loads is executed, whereby imbalance of the loads is corrected.

Figure 5:
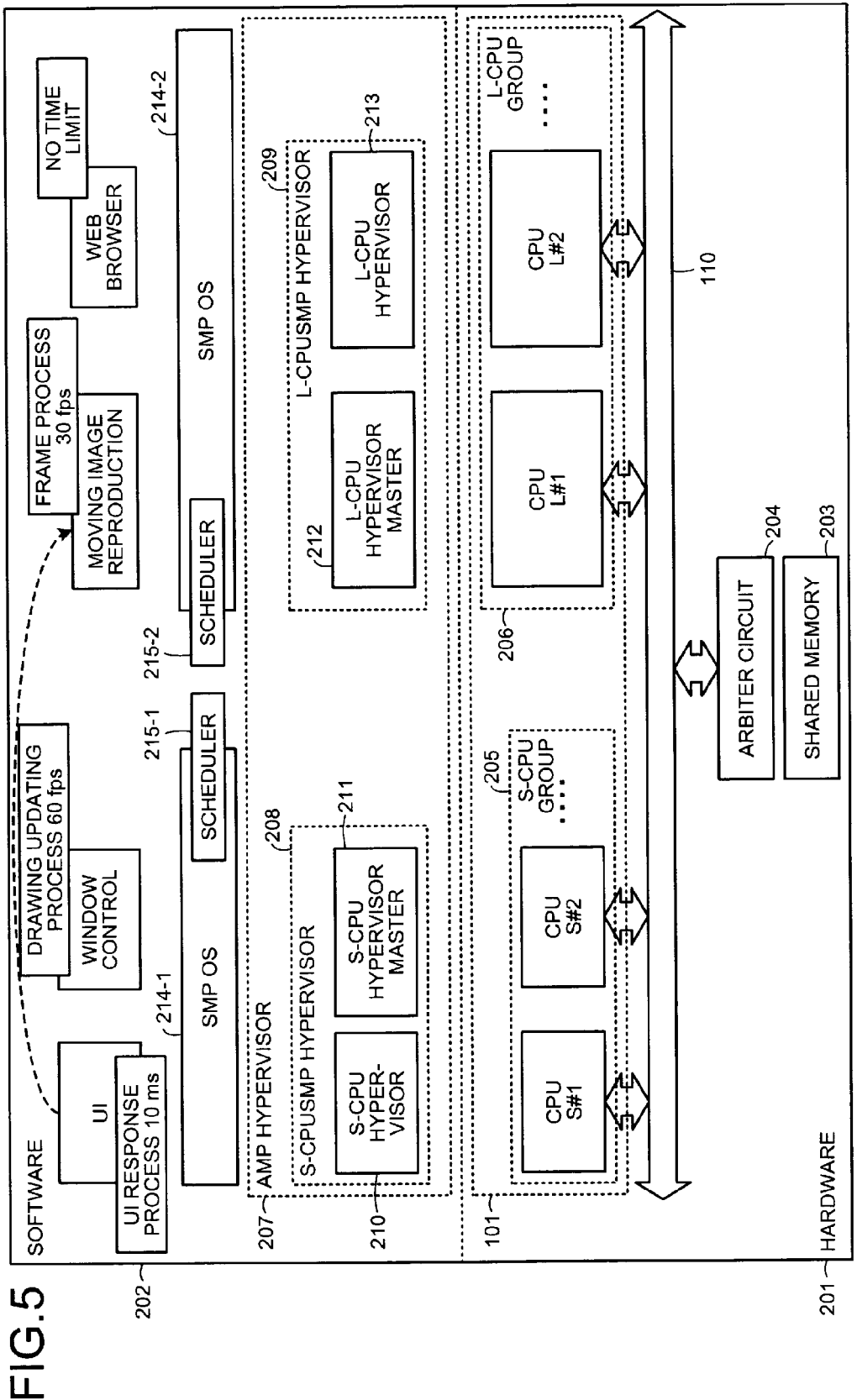
FIG. 5 is an explanatory diagram of a state at the start of starting up of the threads in the multi-core processor system 100.

FIG. 5 is an explanatory diagram of a state at the start of starting up of the threads in the multi-core processor system 100. In FIG. 5, it is assumed that the UI thread, the window control thread, and the web browser thread are assigned respectively as the threads 216-1, 216-2, and 216-4. In this state, in the multi-core processor system 100, the UI thread invokes the moving image reproduction thread and the schedulers 215-1 and 215-2 assign the moving image process as the thread 216-3.

The profile data of each thread is retrieved from the profile data table 301. For example, for the profile data 217-1 corresponding to the UI thread, the process content is set to be the UI response process and the estimated time period is set to be 10 [millisecond]. Similarly, for the profile data 217-2 corresponding to the window control thread, the process content is set to be the drawing updating process and the estimated time period is set to be 16 [millisecond] based on 60 [fps] that is the specification thereof. For the profile data 217-3 corresponding to the moving image reproduction thread, the process content is set to be the frame process and the estimated time period is set to be 33 [millisecond] based on 30 [fps] that is the specification thereof. For the profile data 217-4 corresponding to the web browser thread, the process content is set to be the content process. No restriction on the ending time is especially present.

Figure 6:
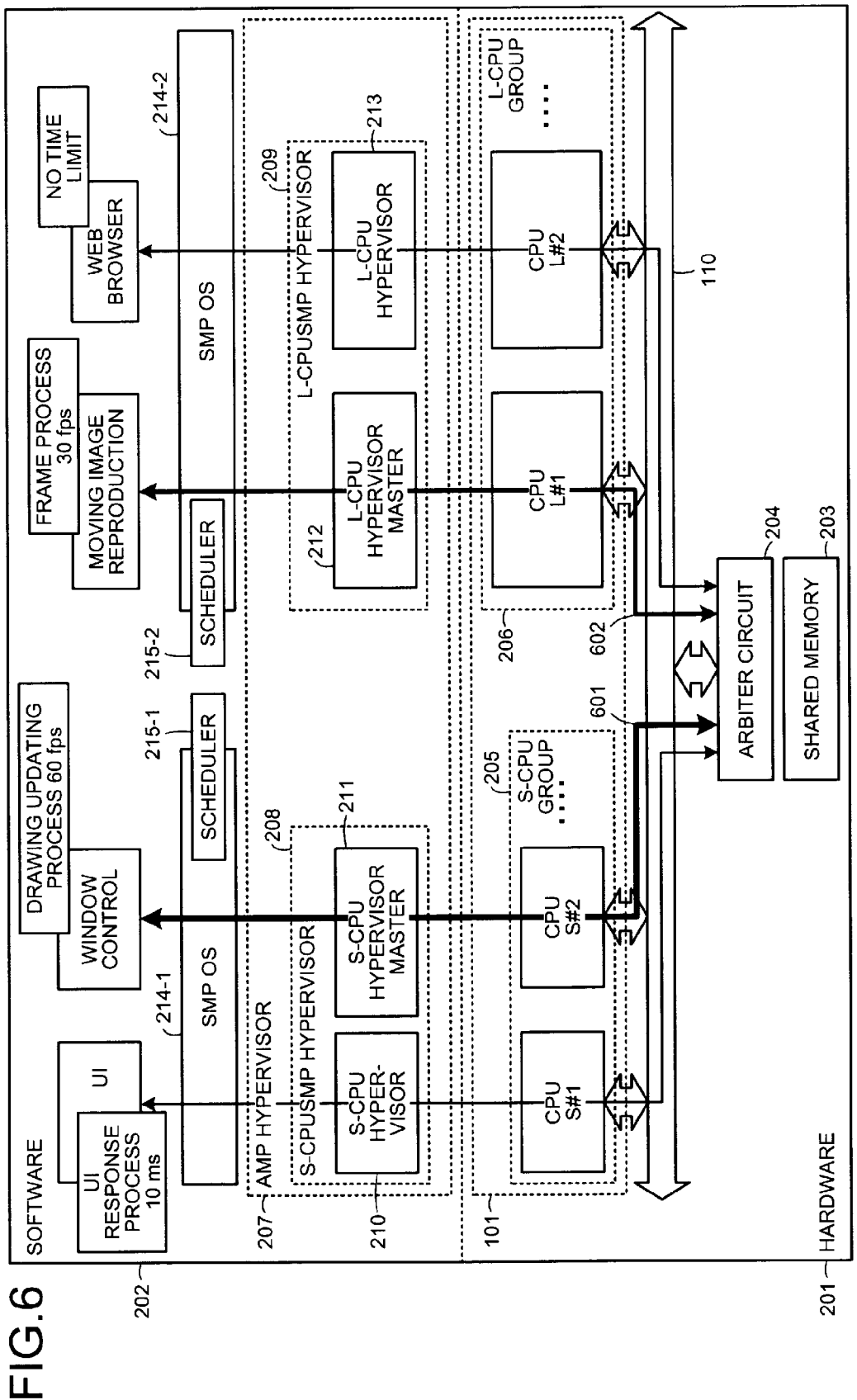
FIG. 6 is an explanatory diagram of a state where contention occurs with respect to accessing of the shared memory 203 by CPUs.

FIG. 6 is an explanatory diagram of a state where contention occurs with respect to accessing of the shared memory 203 by the CPUs. The window control thread executed by the CPUS #2 repeats drawing at a high frame rate of 60 [fps] to realize smooth drawing. On the other hand, the moving image reproduction thread executed by the CPUL #1 easily acquires the access right to the shared memory 203 because this thread is executed by a high performance CPU though the I/O is few.

Therefore, the amount of accesses 601 of the window control thread is larger than the amount of accesses 602 of the moving image reproduction thread. Nevertheless, the moving image reproduction thread more easily acquires the access right to the shared memory 203.

Figure 7:
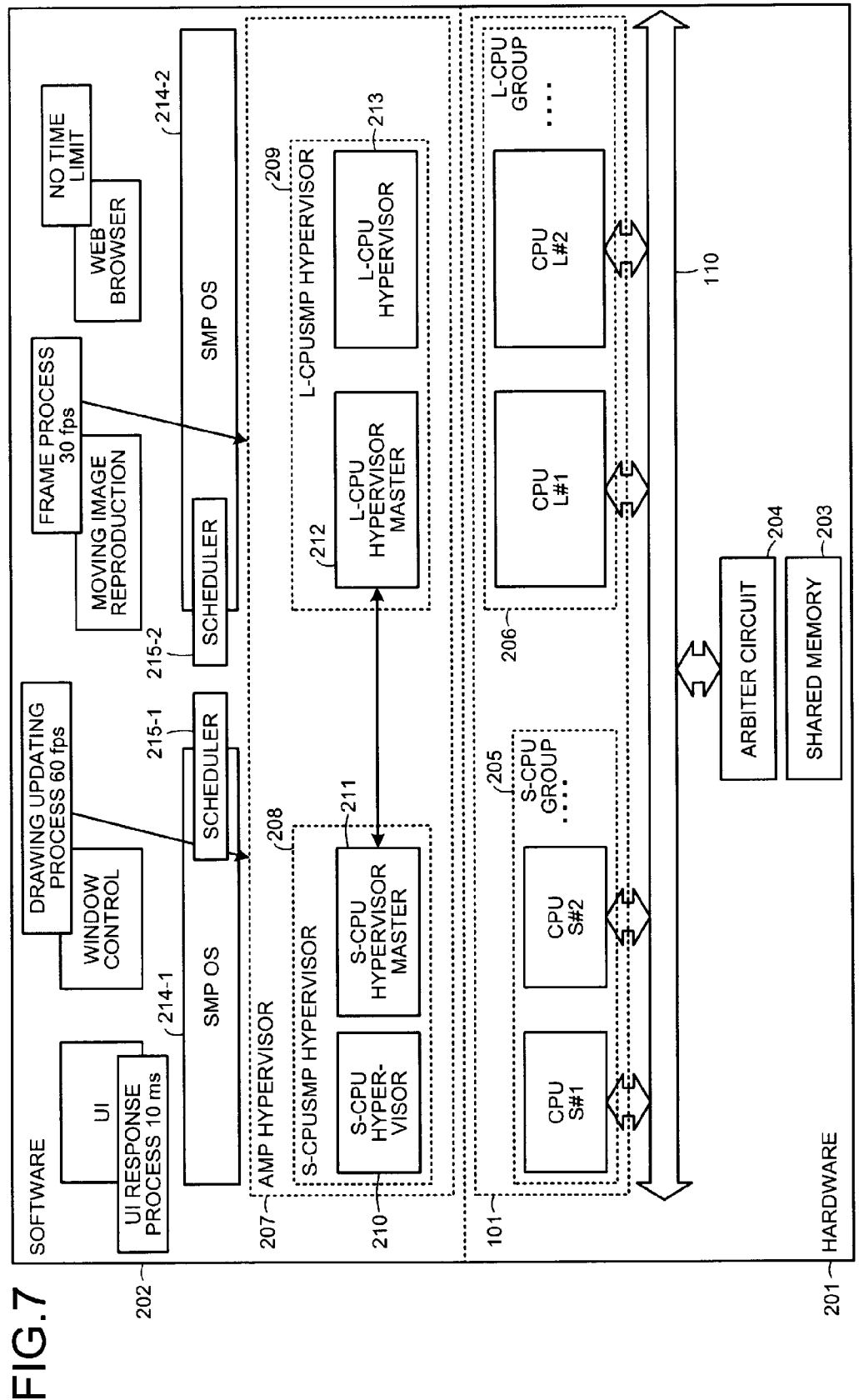
FIG. 7 is an explanatory diagram of the state where abnormality is detected concerning the processing performance of software.

FIG. 7 is an explanatory diagram of the state where abnormality is detected concerning the processing performance of the software. The SMP OSs 214-1 and 214-2 detect whether the processing performance of each thread deviates from the processing performance described in the profile data. At the stage depicted in FIG. 6, the amount of accesses 601 of the window control thread is tremendous and nevertheless, the access right to the shared memory 203 is difficult for the window control thread to receive. Consequently, the processing performance of the window control thread is degraded. When the drawing updating process of the window control thread does not come to an end at 60 [fps], which is the profile data and within 16 [millisecond], which is the estimated time period of the drawing updating process, the SMP OS 214-1 detects this state as abnormality.

After detecting the abnormality, the SMP OS 214-1 notifies the AMP hypervisor 207 of the detection of the abnormality.

In the AMP hypervisor 207, the S-CPU and the L-CPU hypervisor masters 211 and 212 give notification of the information and determine whether load correction is to be executed.

Figure 8:
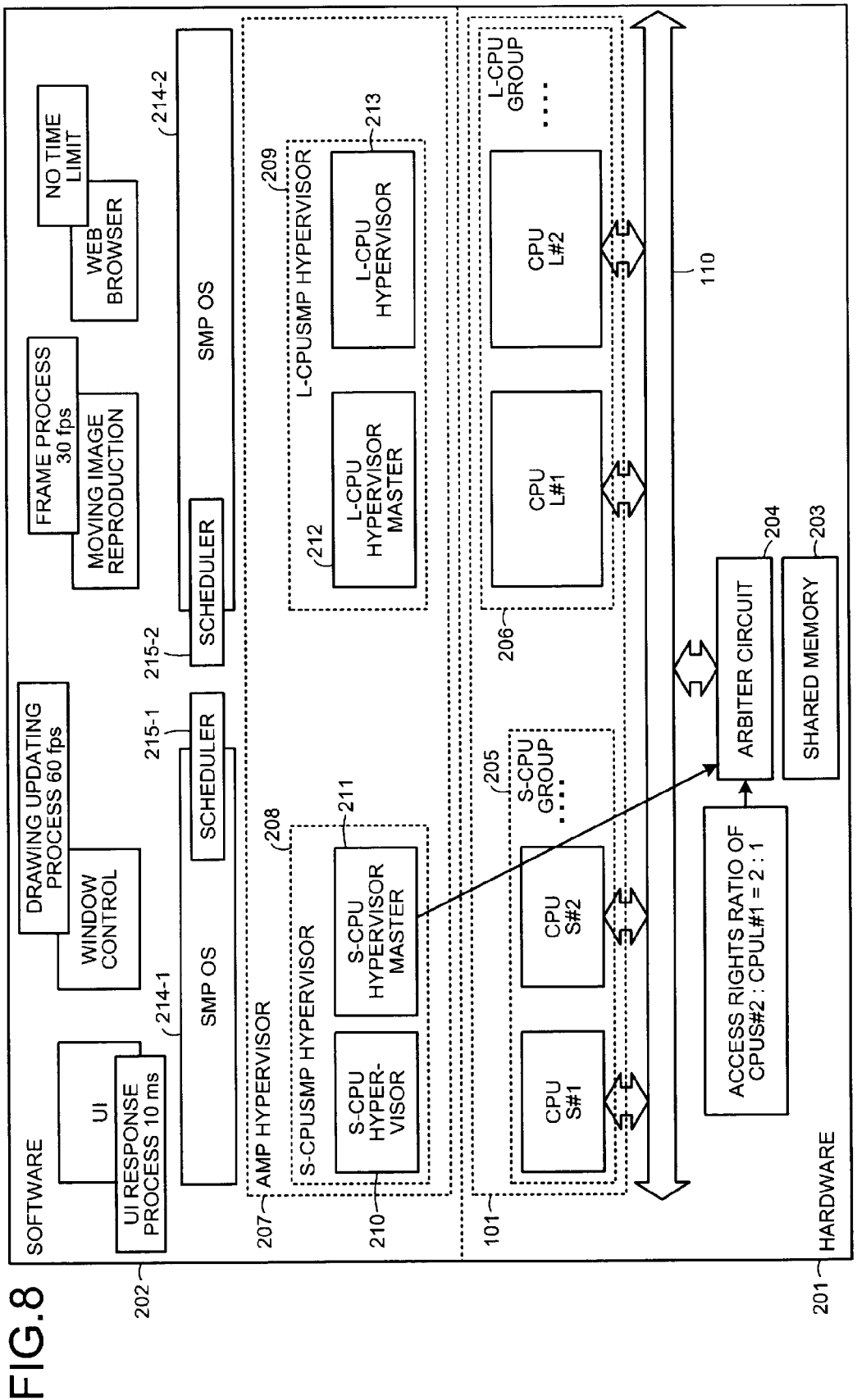
FIG. 8 is an explanatory diagram of the state after load correction arbitration.

FIG. 8 is an explanatory diagram of the state after load correction arbitration. FIG. 8 depicts a state where, in the AMP hypervisor 207, it has been determined that the load correction is to be executed by varying the ratios of the access rights to access the shared memory 203. The CPUS #2 sets the ratios of the access rights for the CPUS #2 and the CPUL #1 to be, for example, CPUS#2:CPUL#1=2:1 for the arbiter circuit 204 via a function of the S-CPU hypervisor master 211. As a result of this setting, the CPUS #2 tends to acquire the access right to access the shared memory 203 and therefore, the high load of the CPUS #2 can be reduced, whereby the loads of the CPUs of the multi-core processor system 100 can be well balanced. The processing performance of the window control thread can be improved and the specification of the processing performance can be complied with.

When the performance of the moving image reproduction thread being executed by the CPUL #1 is degraded as a result of the setting of the ratios of the access rights depicted in FIG. 8, the SMP OS 214-2 detects the abnormality and the AMP hypervisor 207 sets the ratios of the access rights as depicted in FIG. 7.

Figure 9:
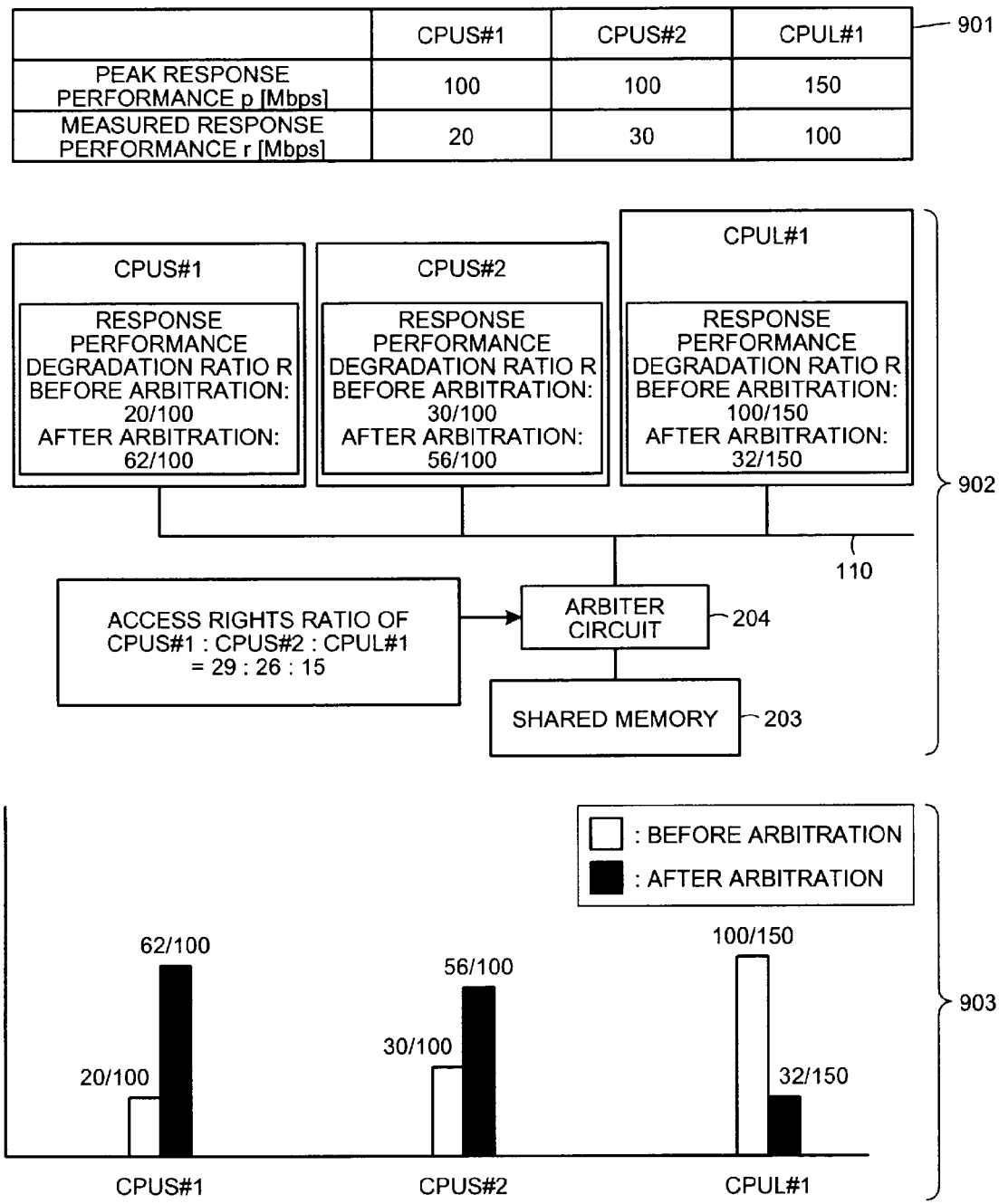
FIG. 9 is an explanatory diagram of the variation of the response performance before and after the load correction.

FIG. 9 is an explanatory diagram of the variation of the response performance before and after the load correction. A table denoted by a reference numeral "901" is an example of the response performance of each of the CPUs. Peak response performance p of the CPUSs #1 and #2 and the CPUL #1 respectively are 100, 100, and 150 [Mbps]. Similarly, measured response performance "r" thereof are 20, 30, and 100 [Mbps], respectively. The transfer capacity of the arbiter circuit 204 is 150 [Mbps]. In this state, the ratios of the access rights to access the shared memory 203 are calculated.

In a block diagram denoted by a reference numeral "902", the response performance degradation ratios R before and after the arbitration are indicated. The response performance degradation ratios R of the CPUSs #1 and #2 and the CPUL #1 are acquired respectively as RS#1=20/100, RS#2=30/100, and RL#1=100/150.

The ratio of access rights of the CPUS #1 to access the arbiter circuit 204 is acquired as follows according to equation (1).

$$((30/100)+(100/150))/((3-1)\cdot((20/100)+(30/100)+(100/150)))=29/70\approx0.41$$

Similarly, the ratio of access rights of the CPUS #2 is acquired as follows.

$$((20/100)+(100/150))/((3-1)\cdot((20/100)+(30/100)+(100/150)))=13/35\approx0.37$$

Similarly, the ratio of access rights of the CPUL #1 is acquired as follows.

$$((20/100)+(30/100))/((3-1)\cdot((20/100)+(30/100)+(100/150)))=3/14\approx0.21$$

Therefore, the ratios of the access rights of the CPUSs #1 and #2 and the CPUL #1 to access the arbiter circuit 204 are 0.41:0.37:0.21. When integers are set to set the ratios in the register of the arbiter circuit 204, the ratios of the access rights are 29:26:15. When the transfer capacity of 150 [Mbps] of the arbiter circuit 204 is distributed at these ratios, the measured response performance degradation ratios R of the CPUSs #1 and #2 and the CPUL #1 are as follows.

$$CPUS\#1:150\times29/(29+26+15)\approx62[Mbps]$$

$$CPUS\#2:150\times26/(29+26+15)\approx56[Mbps]$$

$$CPUL\#1:150\times15/(29+26+15)\approx32[Mbps]$$

Therefore, the response performance degradation ratios R of the CPUs after the arbitration are RS#1=62/100, RS#2=56/100, and the RL#1=32/150.

A graph denoted by a reference numeral "903" is a graph depicting the variation of the response performance degradation ratios R before and after the arbitration. As depicted by the graph, the response performance degradation ratio R after the arbitration is larger for a CPU whose response performance degradation ratio R is smaller before the arbitration, and uneven loads for the CPUs are able to be dispersed. The CPUSs #1 and #2 have small response performance degradation ratios R and high loads before the arbitration, and the response performance degradation ratios R thereof increase and the loads thereof decrease.

Figure 10A:
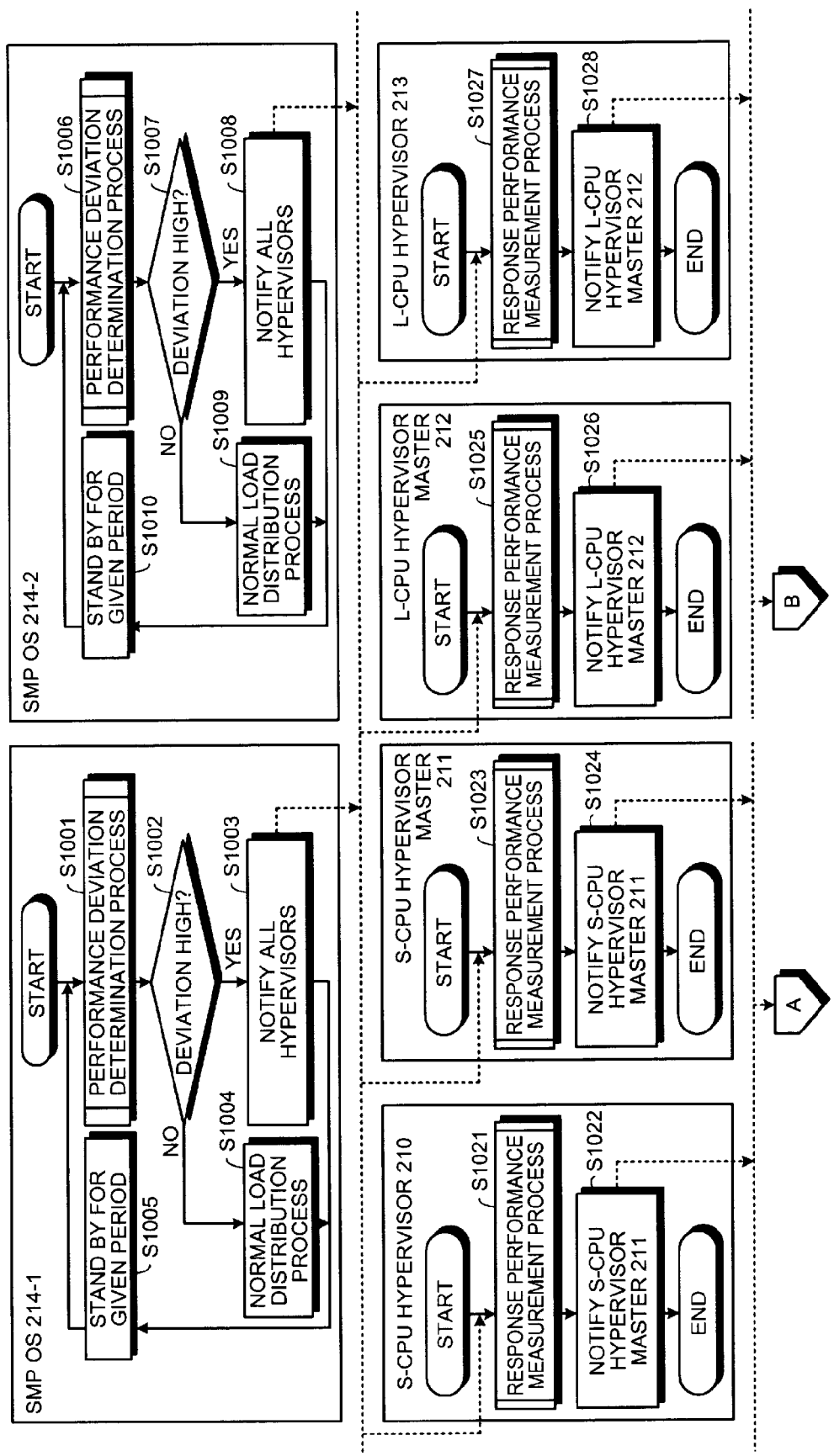
FIG. 10A is a flowchart of an arbiter circuit control process (part 1)

FIGS. 10A and 10B are flowcharts of an arbiter circuit control process. The arbiter circuit control process can roughly be decomposed into four processes. The four processes include a detection process, a measurement process, an aggregation process, and a load correction process. The detection process is executed by the CPUs that execute the SMP OSs 214-1 and 214-2. The measurement process is executed by the CPUs that execute the hypervisors. The aggregation process is executed by the CPUs that execute the S-CPU and L-CPU hypervisor masters 211 and 212. The load correction process is executed by the CPU whose load is lowest.

The detection process is a process denoted by steps S1001 to S1010. A function of the detection process is to detect that the processing performance of the thread being executed is degraded. Steps S1001 to S1005 are executed by all of the CPUs belonging to the S-CPU group 205. Steps S1006 to S1010 are executed by all of the CPUs belonging to the L-CPU group 206. In the embodiment, a case will be described for steps S1001 to S1005 where the CPUS #2 of the S-CPU group 205 executes the detection process.

The CPUS #2 executes a performance deviation determination process (step S1001). Details of the performance deviation determination process will be described later with reference to FIG. 11. After executing the process, the CPUS #2 determines, as a determination result, whether the deviation is high (step S1002). If the CPUS #2 determines that the deviation is high (step S1002: YES), the CPUS #2 notifies all of the hypervisors of the detection of a thread whose deviation is high (step S1003). For example, the CPUS #2 notifies the hypervisors executed by the CPUSs #1, #2, . . . , #M and the CPULs #1, #2, . . . , #N.

If the CPUS #2 determines that the deviation is low (step S1002: NO), the CPUS #2 executes a normal load distribution process (step S1004). The normal load distribution process is a process to execute the load distribution via a function of a scheduler. For example, the scheduler saves the thread whose priority is low and thereby, reduces the loads of the CPUs. After the processes at steps S1003 and S1004 come to an end, the CPUS #2 stands by for a given period (step S1005), and then returns to the process executed at step S1001.

All the CPUs belonging to the L-CPU group 206 execute steps S1006 to S1010. The processes executed at steps S1006 to S1010 are identical to those executed at steps S1001 to S1005 and will not again be described. The CPU also notifies all of the hypervisors at step S1008. For example, the CPUL #2 notifies the hypervisors executed by the CPUSs #1, #2, . . . , #M and the CPULs #1, #2, . . . , #N.

The measurement process is a process denoted by steps S1021 to S1028. A function of the measurement process is measurement of the response performance of each CPU. The measurement process is triggered by notification consequent to the detection process and a function of the hypervisor executes each of the CPUs. For example, via a function of the S-CPU hypervisor 210, the CPUS #1 executes steps S1021 and S1022 to be the measurement process.

The CPUS #1 receives the notification issued at step S1003 or S1008 and executes the response performance measurement process (step S1021). Details of the response performance measurement process will be described later with reference to FIG. 12. After executing the process, the CPUS #1 notifies the S-CPU hypervisor master 211 of the response performance degradation ratio R (step S1022) and ends the process. As an example of the process executed at step S1022, the CPUS #1 writes the response performance degradation ratio R into the register or the cache memory of the CPUL #2. The CPUS #1 may write two values, a measured response performance "r" and a peak response performance "p", without calculating any response performance degradation ratio R.

Similarly, the CPUS #2 also executes steps S1023 and S1024. The processes executed at steps S1023 and S1024 are identical to those executed at steps S1021 and S1022 and will not again be described.

The CPUL #1 receives the notification issued at step S1003 or S1008 and also executes the response performance measurement process similarly to the CPUS #1 (step S1025). After executing the process, the CPUL #1 notifies the L-CPU hypervisor master 212 of the response performance degradation ratio R (step S1026) and ends the process. Similarly, the CPUL #2 executes steps S1027 and S1028. The processes executed at steps S1027 and S1028 are identical to those executed at steps S1025 and S1026 and will not again be described.

The aggregation process is a process denoted by steps S1041 to S1045. The function of the aggregation process is to aggregate the response performance degradation ratios R measured. The aggregation process is triggered by notification consequent to the measurement process and functions of the hypervisors execute the CPUs. For example, via a function of the S-CPU hypervisor master 211, the CPUS #2 executes steps S1041 and S1042 to be the aggregation process. Similarly, via a function of the L-CPU hypervisor master 212, the CPUL #1 executes steps S1043 and S1045 to be the aggregation process.

The CPUS #2 receives the notification issued at step S1022 or S1024 and aggregates the response performance degradation ratios R of the CPUSs #1 to #M (step S1041). As an example of the process executed at step S1022, the CPUS #2 clears to zero, the value of the register or the cache memory to which each response performance of the CPUSs #1 to #M are to be written. Thereafter, the CPUS #2 checks whether the response performance degradation ratios R of the CPUs have been written into all of the areas.

After confirming that the response performance degradation ratios R have been written into all of the areas, the CPUS #2 ends the process at step S1041. After aggregating the response performance degradation ratios R, the CPUS #2 notifies the L-CPU hypervisor master 212 of the end of the aggregation (step S1042), and ends the process.

Similarly, the CPUL #1 receives the notification issued at step S1026 or S1028 and aggregates the response performance degradation ratios R of the CPULs #1 to #N (step S1043). After step S1043 ends, the CPUL #1 receives the notification from the CPUS #2 and aggregates the response performance degradation ratios R of all of the CPUs (step S1044). After the aggregation, the CPUL #1 identifies the CPU whose response performance degradation ratio R is highest as the CPU whose load is lowest (step S1045), and ends the process. The CPU identified executes the load correction process.

The load correction process is a process denoted by steps S1061 to S1066. A function of the load correction process is to balance the loads of the CPUs of the multi-core processor system 100. The load correction process is executed by a function of the hypervisor of the CPU identified in the aggregation process. For example, when the CPUL #3 is identified in the aggregation process, via a function of the L-CPU hypervisor, the CPUL #3 executes steps S1061 to S1066 to be the load correction process. In the embodiment, the description will be made assuming that the CPU identified in the aggregation process is the CPUL #3.

The CPUL #3 identified in the aggregation process executes a load state determination process (step S1061). Details of the load state determination process will be described later with reference to FIG. 13. After ending the process, the CPUL #3 determines whether the load state is balanced (step S1062). If the CPUL #3 determines that the load state is "balanced" (step S1062: YES), the CPUL #3 ends the aggregation process. If the CPUL #3 determines that the load state is "not balanced" (step S1062: NO), the CPUL #3 executes a performance-degradation-cause determination process (step S1063). Details of the performance-degradation-cause determination process will be described later with reference to FIG. 14.

After ending the process, the CPUL #3 determines whether the cause of the performance degradation is "performance degradation caused by contention" (step S1064). If the CPUL #3 determines that the cause of the performance degradation is "performance degradation caused by contention" (step S1064: YES), the CPUL #3 executes the load correction process (step S1065), and ends the load correction process. Details of the load correction process will be described later with reference to FIG. 15. If the CPUL #3 determines that the cause of the performance degradation is "performance degradation caused by a high load" (step S1064: NO), the CPUL #3 executes an OS scheduler operation (step S1066), and ends the load correction process.

As an example of the OS scheduler operation, the schedulers 215-1 and 215-2 of the SMP OSs 214-1 and 214-2 execute a saving process, etc., of each thread. When the multi-core processor system 100 can make inquiries to the user, the SMP OSs 214-1 and 214-2 may display a list of threads as candidates for termination for the user to select from.

Figure 11:
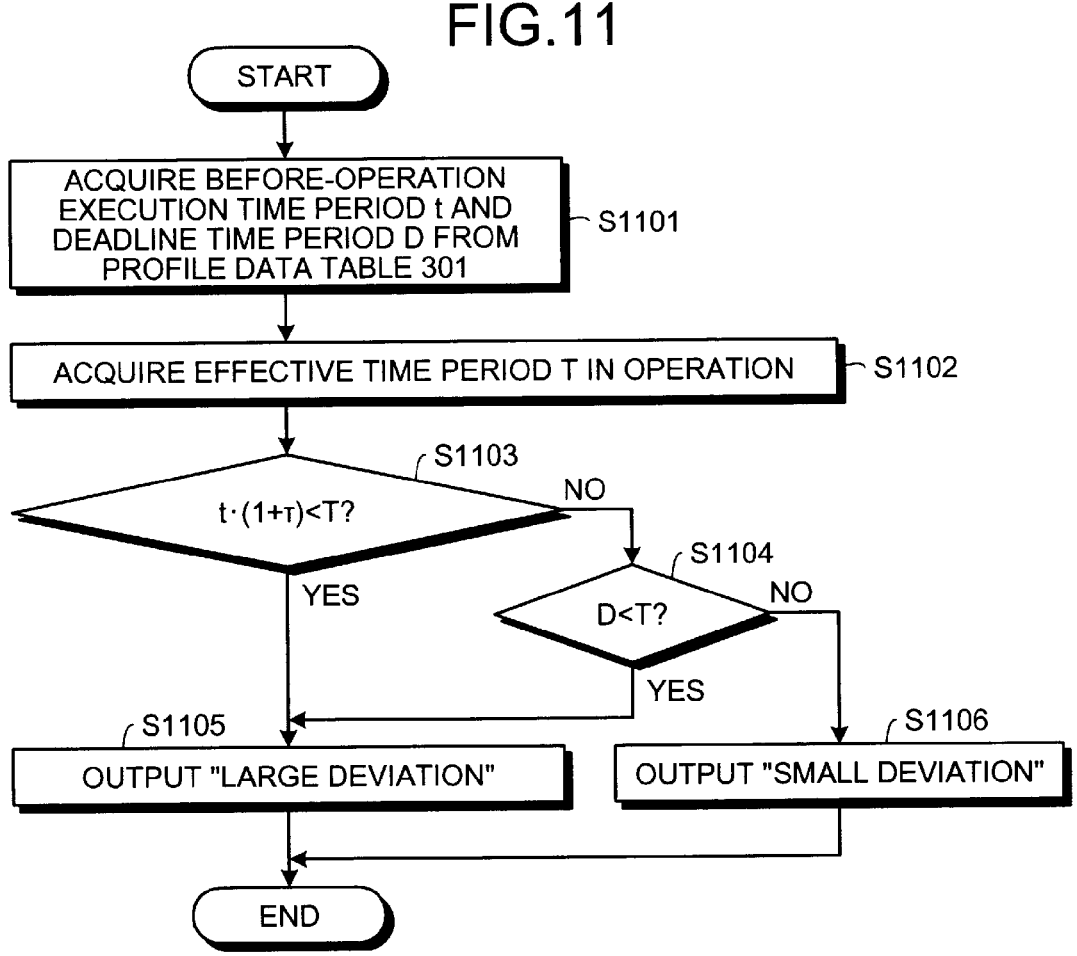
FIG. 11 is a flowchart of a performance deviation determination process.

FIG. 11 is a flowchart of the performance deviation determination process. Although all of the CPUs execute the performance deviation determination process, the description will be made in the embodiment taking an example of a state where the CPUS #1 executes this process. The CPUS #1 acquires the before-operation execution time period t and the deadline time period D from the profile data table 301 (step S1101). The CPUS #1 acquires an effective time period T in operation (step S1102). As an example of a method of acquiring the effective time period T in operation, the thread executed by each CPU may perform operation while monitoring how much time has elapsed. Each CPU acquires, as the effective time period T in operation, the time period that has elapsed as monitored by the thread.

The CPUS #1 uses t and T to determine whether $t \cdot (1+\tau) < T$ is true (step S1103). "$\tau$" is the overhead generated by the systemization and is the amount by which the performance is degraded due to the OS operation, the system process, etc. An example of a value of τ is 0.1. If the CPUS #1 determines that the inequality at step S1103 does not hold (step S1103: NO), the CPUS #1 determines whether D<T is true (step S1104).

If the CPUS #1 determines that the inequality at step S1104 does not hold (step S1104: NO), the CPUS #1 outputs the determination result as "small deviation" (step S1106) and ends the performance deviation determination process. If the CPUS #1 determines that either one of the inequalities at steps S1103 and S1104 holds (step S1103: YES or step S1104: YES), the CPUS #1 outputs the determination result as "large deviation" (step S1105) and ends the performance deviation determination process.

Each of the processes of the moving image reproduction thread, etc. usually cannot come to an end within one frame and are each executed corresponding to the amount of buffer present in the shared memory 203. Therefore, the CPUS #1 may determine whether performance is deviated, taking the amount of the buffer into consideration. For example, with the amount of buffer corresponding to 10 frames, the specification of the process performance can be complied with when a total of the time periods for the 10 frames does not exceed the value that is 10 times as long as the estimated time period even in the case where the CPUS #1 determines "large deviation" for the process for one frame. In this case, the CPUS #1 may output "small deviation".

Figure 12:
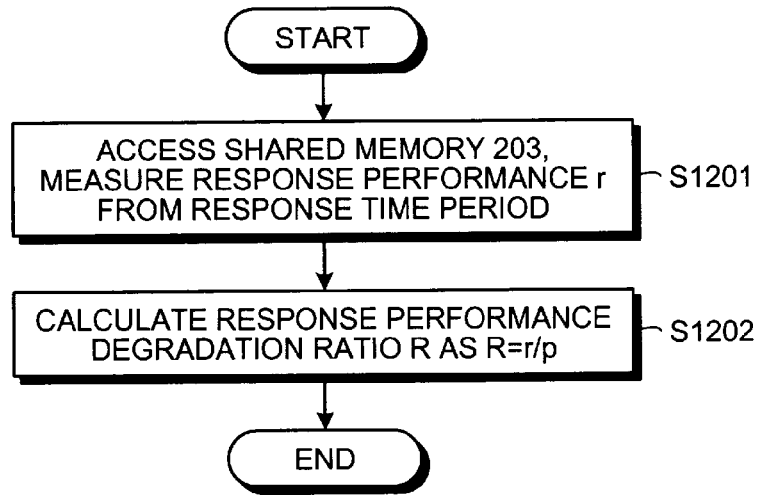
FIG. 12 is a flowchart of a response performance measurement process.

FIG. 12 is a flowchart of the response performance measurement process. Though the response performance measurement process is executed by each of all the CPUs, the description will be made in the embodiment taking an example of a state where the process is executed by the CPUS #1. The CPUS #1 accesses the shared memory 203 and measures the response performance r from the response time period (step S1201). After the measurement, the CPUS #1 calculates the response performance degradation ratio R as R=r/p (step S1202) and ends the response performance measurement process.

Figure 13:
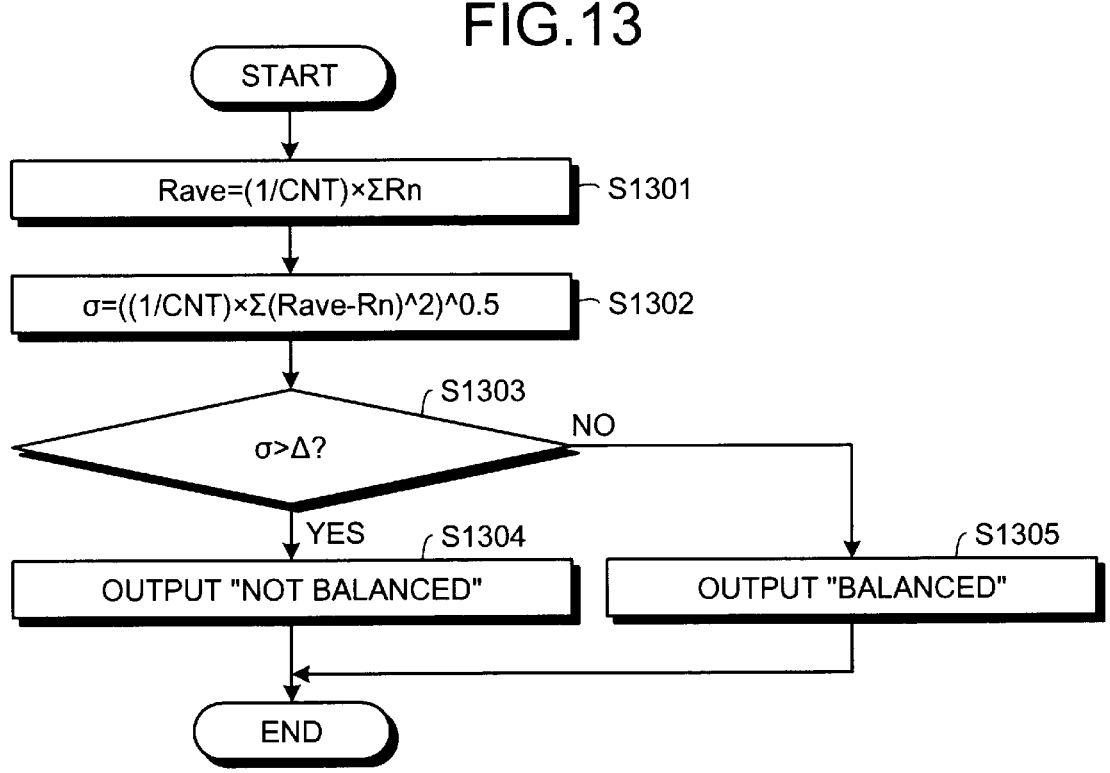
FIG. 13 is a flowchart of a load state determination process.

FIG. 13 is a flowchart of the load state determination process. The load state determination process is executed by the CPU identified in the aggregation process and therefore, may be executed by any of the CPUs. In the description, a state is assumed where the CPUL #3 executes the load state determination process, combined with the example in FIG. 10.

The CPUL #3 calculates the average value Rave of the response performance degradation ratio R that is Rave=(1/CNT)×ΣRn (step S1301). "CNT" is the total number of the CPUs 101 and, more specifically, is the total number of the CPUSs #1 to #M and the CPULs #1 to #N. "ΣRn" is the sum of the response performance degradation ratios R of the CPUSs #1 to #M and the CPULs #1 to #N. The CPUL #3 calculates the standard deviation σ of the response performance degradation ratios R based on an expression σ=((1/CNT)×Σ(Rave−Rn)^2)^0.5 (step S1302).

After calculating the standard deviation σ, the CPUL #3 determines whether σ>Δ is true (step S1303). "Δ" is a predetermined error. If the CPUL #3 determines that σ>Δ is true (step S1303: YES), the CPUL #3 outputs the load state as "not balanced" (step S1304) and ends the load state determination process. If the CPUL #3 determines that σ>Δ is not true (step S1303: NO), the CPUL #3 outputs the load state as "balanced" (step S1305) and ends the load state determination process.

Figure 14:
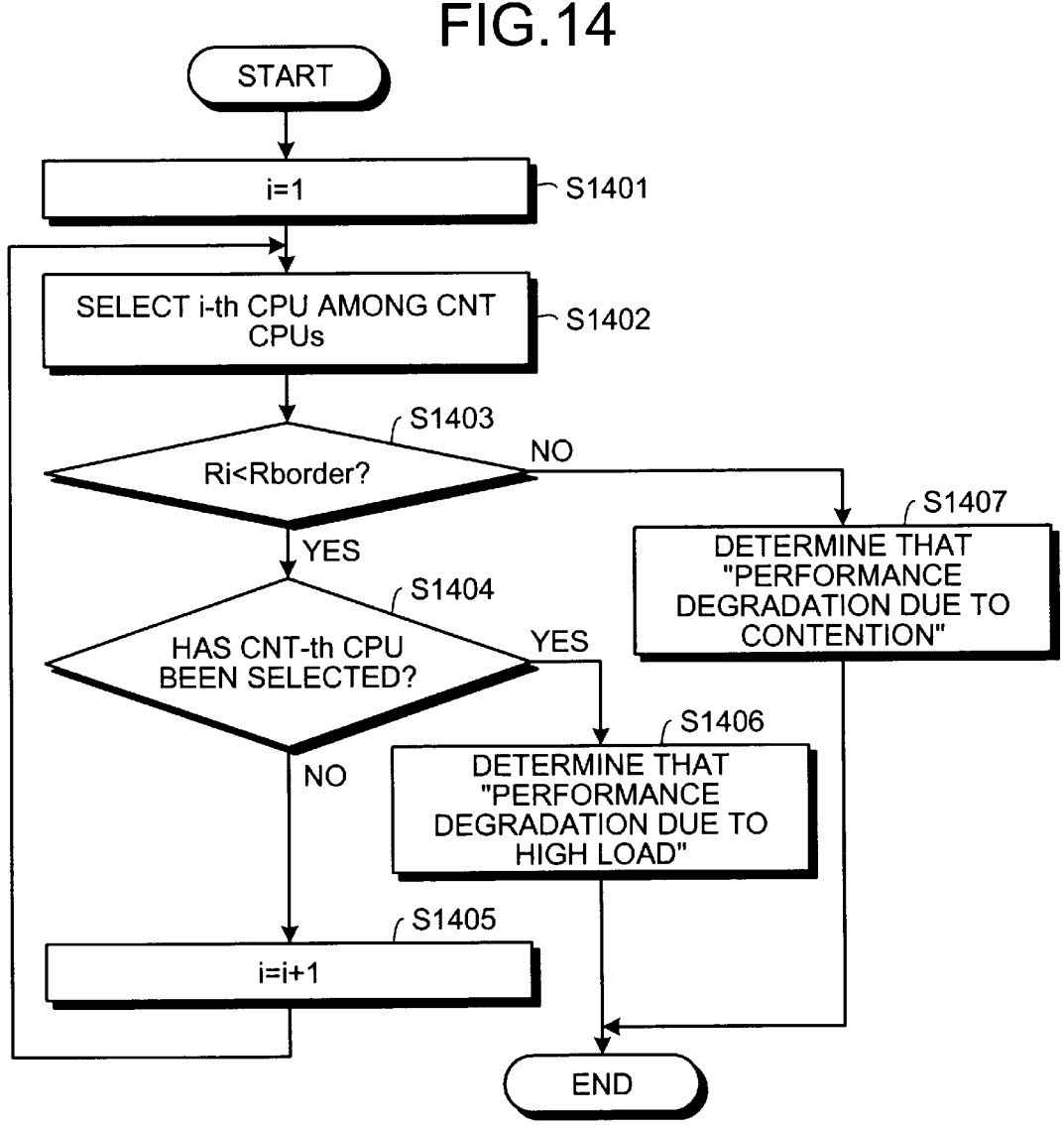
FIG. 14 is a flowchart of a performance-degradation-cause determination process.

FIG. 14 is a flowchart of the performance-degradation-cause determination process. The state is also assumed for the performance-degradation-cause determination process where the CPUL #3 executes the load state determination process, combined with the example of FIG. 10. The CPUL #3 prepares a variable "i" and sets the variable i to be i=1 (step S1401). The CPUL #3 selects the i-th CPU among the CNT CPUs (step S1402). After this selection, the CPUL #3 determines whether Ri<Rborder holds where Ri is the response performance degradation ratio R of the i-th CPU selected (step S1403).

"Rborder" is a threshold value to determine whether the load of the CPU selected is high. For example, assuming that the Rborder is Rborder=1, the CPUL #3 determines that the load is high of the CPU whose performance is degraded even slightly. A normal response performance degradation ratio R is in a range from 0.3 to 0.8 and therefore, Rborder may also be set to be Rborder=0.8.

If the CPUL #3 determines that Ri is smaller than Rborder (step S1403: YES), the CPUL #3 determines whether the CPUL #3 has selected the CNT-th CPU (step S1404). If the CPUL #3 determines that the CNT-th CPU has not been selected (step S1404: NO), the CPUL #3 increments the variable i (step S1405) and proceeds to the process at step S1402.

If the CPUL #3 determines that the CNT-th CPU has been selected (step S1404: YES), the CPUL #3 determines that the cause of performance degradation is "performance degradation due to high load" (step S1406) and ends the performance-degradation-cause determination process. If the CPUL #3 determines that Ri is greater than Rborder (step S1403: NO), the CPUL #3 determines that the performance degradation cause is "performance degradation due to contention" (step S1407) and ends the performance-degradation-cause determination process.

FIG. 15 is a flowchart of the load correction process. The state is also assumed for the load correction process where the CPUL #3 executes the load state determination process, combined with the example in FIG. 10. The CPUL #3 prepares the variable i and sets the variable i to be i=1 (step S1501). The CPUL #3 selects the i-th CPU among the CNT CPUs (step S1502). After this selection, the CPUL #3 sets the ratio of access rights of the selected i-th CPU to access the shared memory 203 to be ((ΣRn)−Ri)/((CNT−1)·(ΣRn)) (step S1503).

After this setting, the CPUL #3 determines whether the CNT-th CPU has been selected (step S1504). If the CPUL #3 determines that the CNT-th CPU has not been selected (step S1504: NO), the CPUL #3 increments the variable i (step S1505) and proceeds to the process at step S1502. If the CPUL #3 determines that the CNT-th CPU has been selected (step S1504: YES), the CPUL #3 notifies the arbiter circuit 204 of the ratios of the access rights of the first to the CNT-th CPUs to access the shared memory 203 (step S1506) and ends the load correction process.

As described, according to the multi-core processor system, the arbiter circuit control method, and the arbiter circuit control program, response performance is calculated from measured speeds and theoretical speeds of access to the shared memory. From each calculated response performance, the ratios of access rights of the CPUs are calculated such that access to the shared memory are increased for the CPUs having a lower response performance, and these ratios are reported to the arbiter circuit. Thereby, the balance of the loads on the CPUs of the multi-core processor system can be corrected. In particular, the loads on the CPUs tend to be unbalanced in a heterogeneous multi-core processor system, nonetheless, in the multi-core processor system according to the embodiment resources of the CPUs can be effectively be utilized.

The multi-core processor system may calculate the variation value of the response performance of each CPU based on the response performance of each CPU and when the variation value of the response performance is larger than the predetermined value, may calculate the ratios of the access rights of the CPUs. Thereby, when high-load CPUs and low-load CPUs are present and the effect of the load correction is strong, the balance of the loads on the CPUs can be corrected by calculating the ratios of the access rights. When the loads on the CPUs are substantially balanced and the effect of the load correction is weak, the load corresponding to those processed in the load correction process can be reduced for the CPUs without calculating the ratios of the access rights.

The multi-core processor system may calculate the ratios of the access rights when the response performance of at least one core among the cores for which response performance is calculated is equal to or higher than the predetermined threshold value. Thereby, when high-load CPUs and low-load CPUs are present and the effect of the load correction is strongly achieved, the balance of the loads of the CPUs can be corrected by calculating the ratios of the access rights. When the loads on all of the CPUs are high and the effect of the load correction is weakly achieved, the load corresponding to those processed in the load correction process can be reduced for the CPUs without calculating the ratios of the access rights.

The multi-core processor system searches the database for the estimated time period corresponding to the process being executed by the software assigned to the CPU and when software is detected that does not come to an end within the estimated time period, the multi-core processor system may calculate the ratios of the access rights. Thereby, when any problem arises as to the processing capacity of any software due to a factor of imbalance of the loads on the CPUs, the balance of the loads on the CPUs can be corrected and the problem of the processing capacity of the software can be solved.

The multi-core processor system may calculate the ratio of access rights for the core whose response performance is highest among the cores. Thereby, the ratio of access rights is calculated for the CPU whose load is lowest and the balance of the loads on the CPUs can be maintained even against a load generated due to the arbiter circuit control process.

The arbiter circuit control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to the multi-core processor system, the arbiter circuit control method, and the arbiter circuit control program, an effect is achieved in that the loads on the CPUs can be corrected to be distributed in a well balanced manner and the CPU resource can be effectively used.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising:
a plurality of cores;
a shared memory accessed by the cores; and
an arbiter circuit that arbitrates contention of right to access the shared memory by the cores, wherein
each of the cores is configured to:
  acquire for the core, a measured speed of access to the shared memory, and
  calculate for the core, a response performance based on the measured speed of access and a theoretical speed of access for the core,
and at least one core of the plurality of cores is configured to:
  calculate for the cores and based on the response performance calculated for each of the cores, ratios of access rights to access the shared memory, the ratios being calculated such that a ratio of access rights for a given core is larger than a ratio of access rights for another core whose response performance is higher than that of the given core, and
  notify the arbiter circuit of the calculated ratios of access rights.

2. The multi-core processor system according to claim 1, wherein each of the cores is configured to:
calculate for each of the cores, a variation value of the response performance, based on the response performance calculated for each of the cores, and
determine whether the variation value calculated for each of the cores is larger than a predetermined value and upon determining that a calculated variation value is larger than the predetermined value, calculates for the cores and based on the response performance calculated for each of the cores, the ratios of access rights to access the shared memory, such that the ratio of access rights for a given core is larger than a ratio of access rights for another core whose response performance is higher than that of the given core.

3. The multi-core processor system according to claim 2, wherein each of the cores is configured to
determine whether among the cores, the response performance of at least one core is at least a predetermined threshold value, and upon determining that the response performance of at least one core is at least the predetermined threshold value, calculates for the cores and based on the response performance calculated for each of the cores, the ratios of access rights to access the shared memory, such that the ratio of access rights of a given core is larger than a ratio of access rights for another core whose response performance is higher than that of the given core.

4. The multi-core processor system according to claim 3, wherein each of the cores is configured to:
retrieve from a database storing for each given process, an estimated time period within which the given process executed in software ends, the estimated time period corresponding to each given process being executed by software respectively assigned to the core, and
detect for the core, software whose given process being executed does not end within the estimated time period retrieved and upon detecting software whose given process does not end within the estimated time period, acquires for the given core, the measured speed of access to the shared memory.

5. The multi-core processor system according to claim 4, wherein each of the cores is configured to:
   identify a core whose response performance is highest among the cores as a core whose load is lowest, based on the response performance calculated for each of the cores, and
   calculate for the identified core, the ratio of access rights to access the shared memory.

6. An arbiter circuit control method executed by a given core among a plurality of cores, to control an arbiter circuit that arbitrates contention of right to access a shared memory by the cores, the method comprising:
   acquiring for each of the cores, a measured speed of access to the shared memory;
   calculating ratios of access rights to access the shared memory by the cores, based on a response performance calculated for each of the cores from the measured speed of access acquired for each of the cores at the acquisition step and a theoretical speed of access for each of the cores, the ratios of access rights being calculated such that a ratio of access rights for a given core is larger than a ratio of access rights for another core whose response performance is higher than that of the given core; and
   notifying the arbiter circuit of the calculated ratios of access rights of the cores to access the shared memory.

7. A non-transitory computer-readable recording medium storing an arbiter circuit control program that causes a given core among a plurality of cores to execute a process of controlling an arbiter circuit that arbitrates contention of right to access a shared memory by the cores, the process comprising:
   acquiring for each of the cores, a measured speed of access to the shared memory;
   calculating ratios of access rights to access the shared memory by the cores, based on a response performance calculated for each of the cores from the measured speed of access acquired for each of the cores at the acquisition step and a theoretical speed of access for each of the cores, the ratios of access rights being calculated such that a ratio of access rights for a given core is larger than a ratio of access rights for another core whose response performance is higher than that of the given core; and
   notifying the arbiter circuit of the calculated ratios of access rights of the cores to access the shared memory.

8. A multicore processor system comprising:
   a first core;
   a second core having performance that is different from performance of the first core; and
   a controller that controls a ratio of access rights to a memory shared by the first core and second core, the ratio of access rights being on the basis of a measured speed of access from the first core to the memory, a measured speed of access from the second core to the memory, a theoretical speed of access for the first core, and a theoretical speed of access for the second core.

9. The multicore processor system according to claim 8, wherein the controller controls the ratio of access rights so as to be substantially balancing a response performance degradation ratio indicating degradation of response performance of the first core and the second core on the basis of the measured speed and the theoretical speed of the first core and of the second core.

10. A control method executed by a controller that controls access rights to access shared memory by a first core and a second core having performance that is different from performance of the first core, the method comprising:
   measuring a first access speed to the shared memory by the first core;
   measuring a second access speed to the shared memory by the second core; and
   controlling a ratio of access rights to a memory shared by the first core and second core, the ratio of access rights being on the basis of a measured speed of access from the first core to the memory, a measured speed of access from the second core to the memory, a theoretical speed of access for the first core, and a theoretical speed of access for the second core.

11. A mobile terminal comprising:
   a first core;
   a second core having performance that is different from performance of the first core;
   a controller that controls a ratio of access rights to a memory shared by the first core and second core, the ratio of access rights being on the basis of a measured speed of access from the first core to the memory, a measured speed of access from the second core to the memory, a theoretical speed of access for the first core, and a theoretical speed of access for the second core;
   a display device that displays processing results of any one of the first and the second cores; and
   a keyboard that receives input of data to be processed by any one of the first and the second cores.

* * * * *